United States Patent
Okubo et al.

(10) Patent No.: US 7,117,725 B2
(45) Date of Patent: Oct. 10, 2006

(54) IN-CYLINDER PRESSURE DETECTING APPARATUS

(75) Inventors: Katsura Okubo, Saitama (JP); Koichiro Shinozaki, Saitama (JP); Yuji Yasui, Saitama (JP); Masahiro Sato, Saitama (JP); Keiichi Nagashima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/051,464

(22) Filed: Feb. 7, 2005

(65) Prior Publication Data

US 2005/0199049 A1    Sep. 15, 2005

(30) Foreign Application Priority Data

Mar. 12, 2004  (JP)  ............................ 2004-071237
Apr. 30, 2004  (JP)  ............................ 2004-135577

(51) Int. Cl.
*G01M 15/00*   (2006.01)
(52) U.S. Cl. ..................... 73/115; 73/116; 73/117.2; 73/117.3; 73/118.1
(58) Field of Classification Search ............... 73/115, 73/116, 117.2, 117.3, 118.1
See application file for complete search history.

(56) References Cited

U.S. PATENT DOCUMENTS 6,389,364 B1 * 5/2002 Vyers .......................... 702/45

FOREIGN PATENT DOCUMENTS

| EP | 0 021 340 A2 | | 1/1981 |
|----|----|----|----|
| JP | 60-111935 | | 6/1985 |
| JP | 04198726 A | * | 7/1992 |
| JP | 5-142081 | | 6/1993 |
| JP | 5-172679 | | 7/1993 |
| JP | 7-280686 | | 10/1995 |
| JP | 2001152952 A | * | 6/2001 |

* cited by examiner

Primary Examiner—Edward Lefkowitz
Assistant Examiner—Freddie Kirkland, III
(74) Attorney, Agent, or Firm—Arent Fox PLLC

(57) ABSTRACT

An apparatus for detecting an in-cylinder pressure of an engine is provided. The apparatus comprises an in-cylinder pressure sensor for outputting a signal indicating a change rate of an in-cylinder pressure and a control unit. The control unit is configured to correct the signal from the in-cylinder pressure sensor, integrate the corrected signal to determine the in-cylinder pressure, determine a change rate of a drift contained in the determined in-cylinder, and feedback the change rate of the drift so that the correction of the signal is made with the change rate of the drift. Since the output of the in-cylinder pressure sensor from which a drift has been removed is integrated, it is prevented that a drift appears in the in-cylinder pressure obtained by the integral. A resetting operation is not required so as to remove a drift.

26 Claims, 28 Drawing Sheets

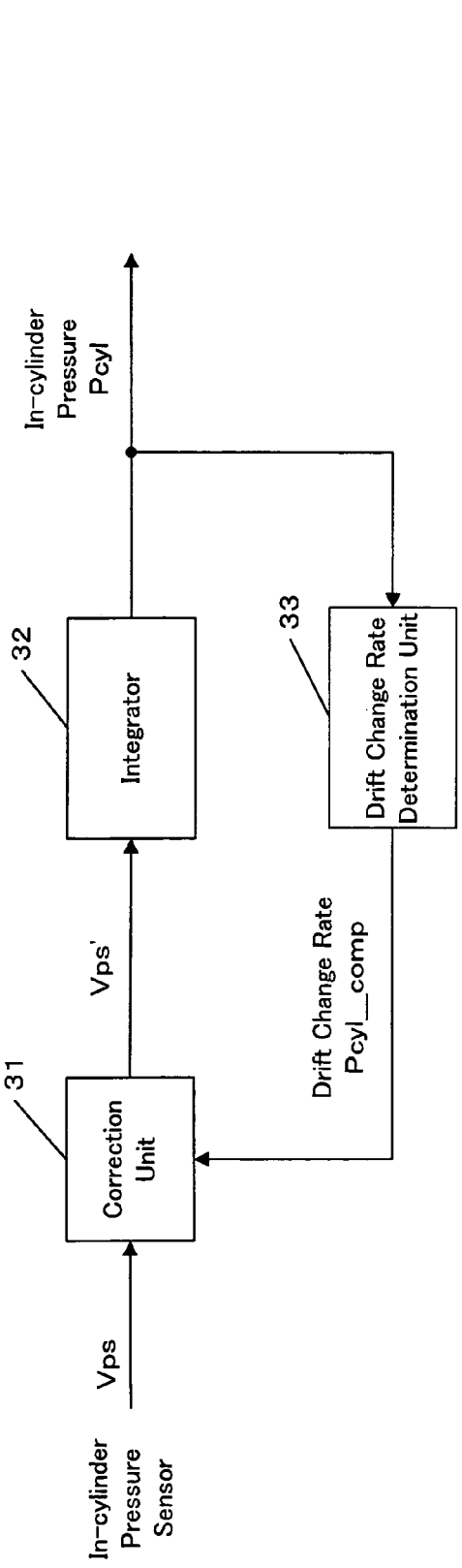
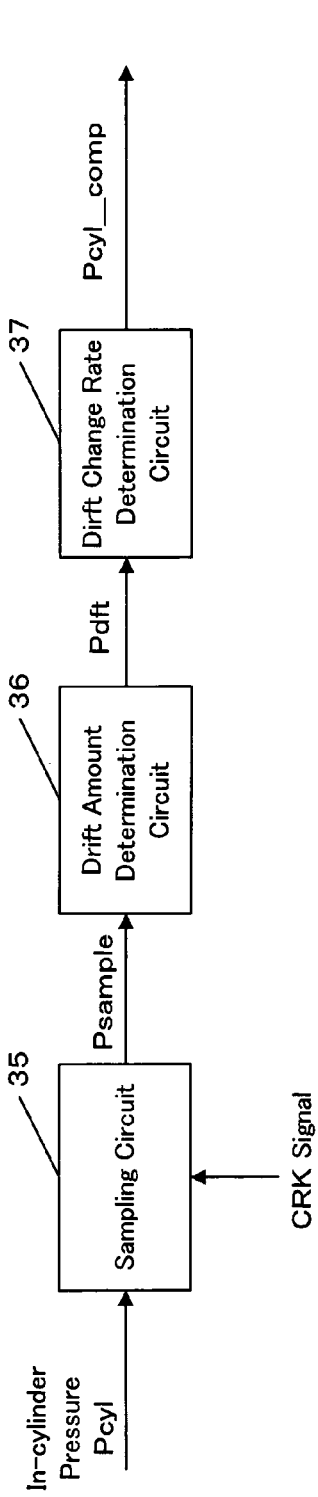
Figure 4
Figure 5

IN-CYLINDER PRESSURE DETECTING APPARATUS

BACKGROUND OF THE INVENTION

The present invention relates to an apparatus for detecting an in-cylinder pressure of an engine, and, more particularly, it relates to an apparatus for detecting an in-cylinder pressure more accurately by correcting a drift of the in-cylinder pressure.

Conventionally, an in-cylinder pressure sensor is provided in a cylinder of an engine so as to detect a pressure within the cylinder (this pressure will be hereinafter referred to as an in-cylinder pressure). The in-cylinder pressure detected by such a sensor is used in various control for the engine.

A sensor using a piezo-electric element is known as an in-cylinder pressure sensor. This sensor detects the rate of change of the in-cylinder pressure. As shown in FIG. 31, the change rate of the in-cylinder pressure detected by an in-cylinder pressure sensor 500 is typically integrated by an integrator circuit 501. An output of the integrator circuit 501 is used as the in-cylinder pressure.

In general, when the piezo-electric element is used, there are hysteresis characteristics in a relationship between a change in the actual in-cylinder pressure and an output of the in-cylinder pressure sensor. Furthermore, the output of the in-cylinder pressure sensor increases as the temperature of the piezo-electric element increases. When such an in-cylinder pressure sensor is mounted on the engine, variations occur in the output of the in-cylinder pressure sensor due to the heat generation from the engine. As a result, "deviation" (or drift) appears in the waveform of the in-cylinder pressure generated by the integrator circuit as shown in FIG. 32.

If such a drift appears, it may be difficult to detect the in-cylinder pressure with accuracy. The output of the in-cylinder pressure sensor is typically converted from analog to digital (A/D conversion) for subsequent computer processes. If a drift component is contained in the output of the in-cylinder pressure sensor, a correlation may be lost between the analog value of the output of the in-cylinder pressure sensor and the digital value obtained by the A/D conversion.

The Japanese Patent Publication No. H07-280686 discloses a technique for resetting an integrator circuit so as to correct such a drift. Referring to FIG. 33, a switching element 512 is closed at a predetermined timing in each combustion cycle of the engine. When the switching element is closed, the potential difference (voltage) across a capacitor 513 becomes zero. An output of an operational amplifier 514 is reset to a reference value. In response to such a resetting operation, a drift is removed.

FIG. 34 shows the waveform of the in-cylinder pressure generated by the integrator circuit when the above-described resetting operation is performed. The resetting operation is carried out at time t1, t2, t3, t4 and t5. It is seen that a waveform 515 caused by such a resetting operation is superposed on the waveform of the in-cylinder pressure. As a result, discontinuous frequency characteristics appear in the in-cylinder pressure waveform around the resetting operation. Due to such discontinuous frequency characteristics, an undesired frequency component may be introduced in subsequent computer processes that use the in-cylinder pressure. This may reduce the accuracy of control of the engine. Also, even if such a resetting operation is performed, a drift increases between resetting operations (that is, during one combustion cycle).

Thus, there is a need for an apparatus and method for preventing a drift from appearing in the in-cylinder pressure without performing such a resetting operation.

SUMMARY OF THE INVENTION

According to a first aspect of the present invention, an apparatus for detecting an in-cylinder pressure of an engine is provided. The apparatus comprises an in-cylinder pressure sensor for outputting a signal indicating a change rate of an in-cylinder pressure and a control unit. The control unit is configured to correct the signal from the in-cylinder pressure sensor, integrate the corrected signal to determine the in-cylinder pressure, determine a change rate of a drift contained in the determined in-cylinder, and feedback the change rate of the drift so that the correction of the signal is made with the change rate of the drift.

In one embodiment of the present invention, the control unit is further configured to sample the determined internal cylinder pressure, determine a drift amount based on the sampled in-cylinder pressure, and determine the change rate of the drift based on the drift amount. The drift amount may be determined by subtracting a reference value from the sampled in-cylinder pressure.

In another embodiment of the present invention, the control unit is further configured to sample the determined in-cylinder pressure in a first cycle, determine a drift amount based on the sampled in-cylinder pressure, sample the drift amount in a second cycle shorter than the first cycle, apply a moving average to the sampled drift amount to determine a drift amount per the second cycle, and determine the change rate of the drift based on the drift amount per the second cycle. The drift amount may be determined by subtracting a reference value from the sampled in-cylinder pressure.

In yet another embodiment of the present invention, the control unit is further configured to determine a drift correction term for causing the change rate of the drift to converge to zero. The correction of the signal from the in-cylinder pressure sensor is made with the drift correction term. The control unit may be configured to perform a response assignment control that is capable of specifying a convergence speed of the change rate of the drift to zero to determine the drift correction term.

According to this aspect of the present invention, it is prevented that discontinuous frequency characteristics appear in the waveform of the in-cylinder pressure because a drift component can be removed without performing a resetting operation.

Furthermore, according to this aspect of the present invention, a drift component contained in the in-cylinder pressure is fed back at a predetermined time interval and the fed back drift component is removed from the output of the in-cylinder pressure sensor. By using the output of the in-cylinder pressure sensor that has been corrected to remove a drift component, a correlation between the analog value of the output of the in-cylinder pressure sensor and the digital value obtained by the A/D conversion of the output of the in-cylinder pressure sensor can be maintained. Since the output of the in-cylinder pressure sensor that has been corrected to remove the drift component is integrated, it can be prevented that a drift increases in the in-cylinder pressure obtained by the integral.

According to a second aspect of the present invention, an in-cylinder pressure detecting apparatus comprises an in-cylinder pressure sensor for outputting a signal indicating a change rate of an in-cylinder pressure of an engine, and a control unit. The control unit is configured to integrate the signal to determine the in-cylinder pressure, and correct the in-cylinder pressure with a drift correction term, the drift correction term removing a drift in the in-cylinder pressure.

In one embodiment of the present invention, the control unit is further configured to sample the in-cylinder pressure determined by the integral in a first cycle, determine a drift amount based on the sampled in-cylinder pressure, sample the drift amount in a second cycle shorter than the first cycle, average the sampled drift amount to determine the drift correction term, and subtract the drift correction term from the in-cylinder pressure determined by the integral to determine the corrected in-cylinder pressure.

The drift amount may be determined by subtracting a reference value from the sampled in-cylinder pressure. The first cycle may be a cycle in which an intake stroke of a combustion cycle of the engine is performed.

In another embodiment of the present invention, the control unit is further configured to sample the corrected in-cylinder pressure in a first cycle, determine a drift amount based on the sampled corrected in-cylinder pressure, sample the drift amount in a second cycle shorter than the first cycle, average the sampled drift amount, determine the drift correction term to cause the averaged drift amount to converge to zero, and feedback the drift correction term so that the correction is made with the drift correction term.

According to this aspect of the present invention, it is prevented that discontinuous frequency characteristics appear in the waveform of the in-cylinder pressure because a drift component can be removed without performing a resetting operation.

According to this aspect of the present invention, a drift is removed in a predetermined time interval from the in-cylinder pressure determined based on the output of the in-cylinder pressure sensor. By using the in-cylinder pressure from which a drift has been removed, a correlation between the analog value of the output of the in-cylinder pressure sensor and the digital value obtained by the A/D conversion of the output of the in-cylinder pressure sensor can be maintained.

According to this aspect of the present invention, a drift correction term is determined in a second cycle shorter than the first cycle in which the in-cylinder pressure is determined. Since a drift is removed from the in-cylinder pressure in such a shorter cycle, it can be prevented that a drift in the in-cylinder pressure increases over the first cycle.

BRIEF DESCRIPTION OF THE DRAWINGS

FIG. 4 is a block diagram of an in-cylinder pressure detecting apparatus in accordance with one embodiment of the present invention.

FIG. 5 is a block diagram of one example of a drift change rate determination unit in accordance with one embodiment of the present invention.

DESCRIPTION OF THE PREFERRED EMBODIMENTS

Figure 1:
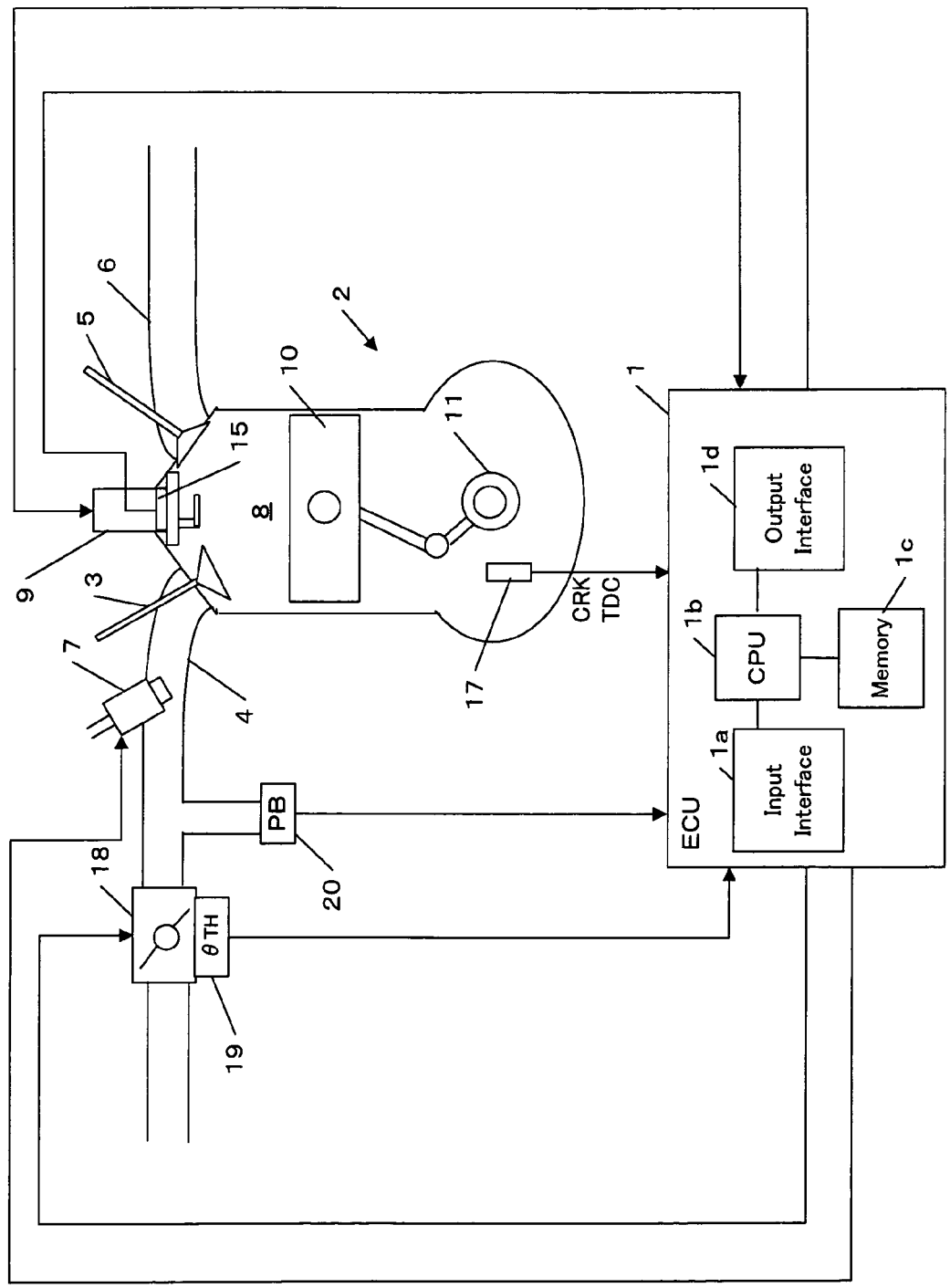
FIG. 1 is a block diagram of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer and comprises an input interface 1a for receiving data sent from each part of the vehicle, a CPU 1b for carrying out operation for controlling each part of the vehicle, a memory 1c including a read only memory (ROM) and a random access memory (RAM), and an output interface 1d for sending a control signal to each part of the vehicle. One or more programs and data for controlling each part of the vehicle are stored in the ROM. The ROM may be a rewritable ROM such as an EPROM. The RAM provides work areas for operation by the CPU 1b, in which data sent from each part of the vehicle as well as a control signal to be sent out to each part of the vehicle are temporarily stored.

An engine 2 is, for example, a 4-cycle engine. The engine 2 may comprise a variable compression ratio mechanism.

The engine 2 is connected to an intake manifold 4 through an air intake valve 3 and connected to an exhaust manifold 6 through an exhaust valve 5. The intake valve 3 and the exhaust valve 5 may be driven by a continuously variable valve driving system. A fuel injection valve 7 for injecting fuel in accordance with a control signal from the ECU 1 is disposed in the intake manifold 4. Alternatively, the fuel injection valve 7 may be disposed in a combustion chamber 8.

The engine 2 takes air-fuel mixture from the air taken from the intake manifold 4 and the fuel injected by the fuel injection valve 7 into the combustion chamber 8. A spark plug 9 is provided in the combustion chamber 8 to ignite a spark in accordance with an ignition timing signal from the ECU 1. The air-fuel mixture is burned by the spark ignited by the spark plug 9.

An in-cylinder pressure sensor 15 is embedded in a portion, contacting with the cylinder, of the spark plug 9. Alternatively, when the fuel injection valve 7 is disposed in the combustion chamber 8, the in-cylinder pressure sensor 15 may be embedded in a portion, contacting with the engine cylinder, of the fuel injection valve 7. The in-cylinder pressure sensor 15 generates a signal indicating a change rate of the in-cylinder pressure within the combustion chamber 8. The signal is sent to the ECU 1.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with a TDC position of a piston 10.

A throttle valve 18 is disposed in an intake manifold 4 of the engine 2. An opening degree of the throttle valve 18 is controlled by a control signal from the ECU 1. A throttle valve opening sensor (θTH) 19, which is connected to the throttle valve 18, supplies the ECU 1 with a signal indicating the opening degree of the throttle valve 18.

An intake manifold pressure (Pb) sensor 20 is disposed downstream of the throttle valve 18. The intake manifold pressure Pb detected by the Pb sensor 20 is sent to the ECU 1.

A signal sent to the ECU 1 is passed to the input interface 1a. The input interface 1a converts an analog signal value into a digital signal value. The CPU 1b processes the resulting digital signal in accordance with a program stored in the memory 1c, and creates a control signal. The output interface 1d sends the control signal to actuators for the fuel injection valve 7, spark plug 9, throttle valve 18, and other mechanical components.

Figure 2:
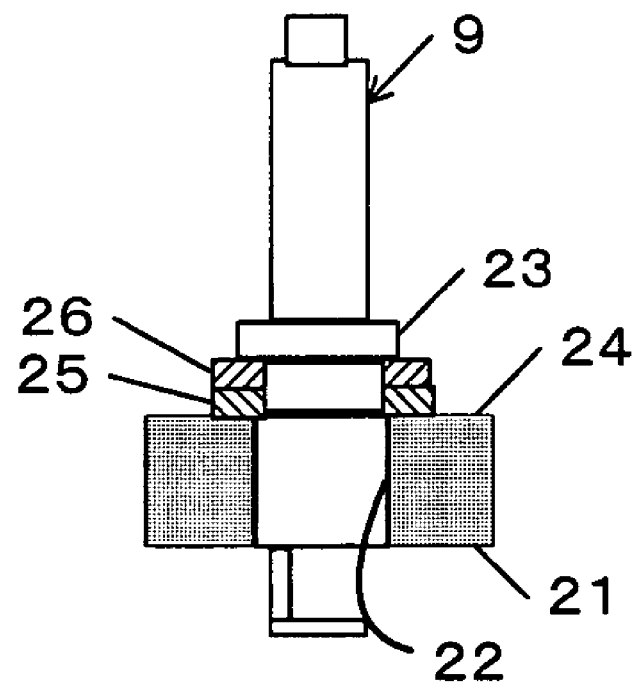
FIG. 2 shows an exemplary attachment of an in-cylinder pressure sensor in accordance with one embodiment of the present invention.

FIG. 2 shows an example of the in-cylinder pressure sensor 15. The spark plug 9 is screwed in a screw hole 22 of a cylinder head 21. A sensor element 25 of the in-cylinder pressure sensor and a washer 26 are sandwiched between a spark plug attaching surface 23 and a spark plug washer surface 24 of the cylinder head 21. The sensor element 25 is a piezo-electric element.

Since the sensor element 25 is tightened as a washer of the spark plug 9, the sensor element 25 is given a predetermined tightening load. When the pressure within the combustion chamber 8 changes, the load applied to the sensor element portion 25 changes. The in-cylinder pressure sensor 15 detects a change in the load relative to the predetermined tightening load as a change in the in-cylinder pressure.

Detecting the in-cylinder pressure according to first through third embodiments of the present invention will be described.

First and Second Embodiments

Figure 3:
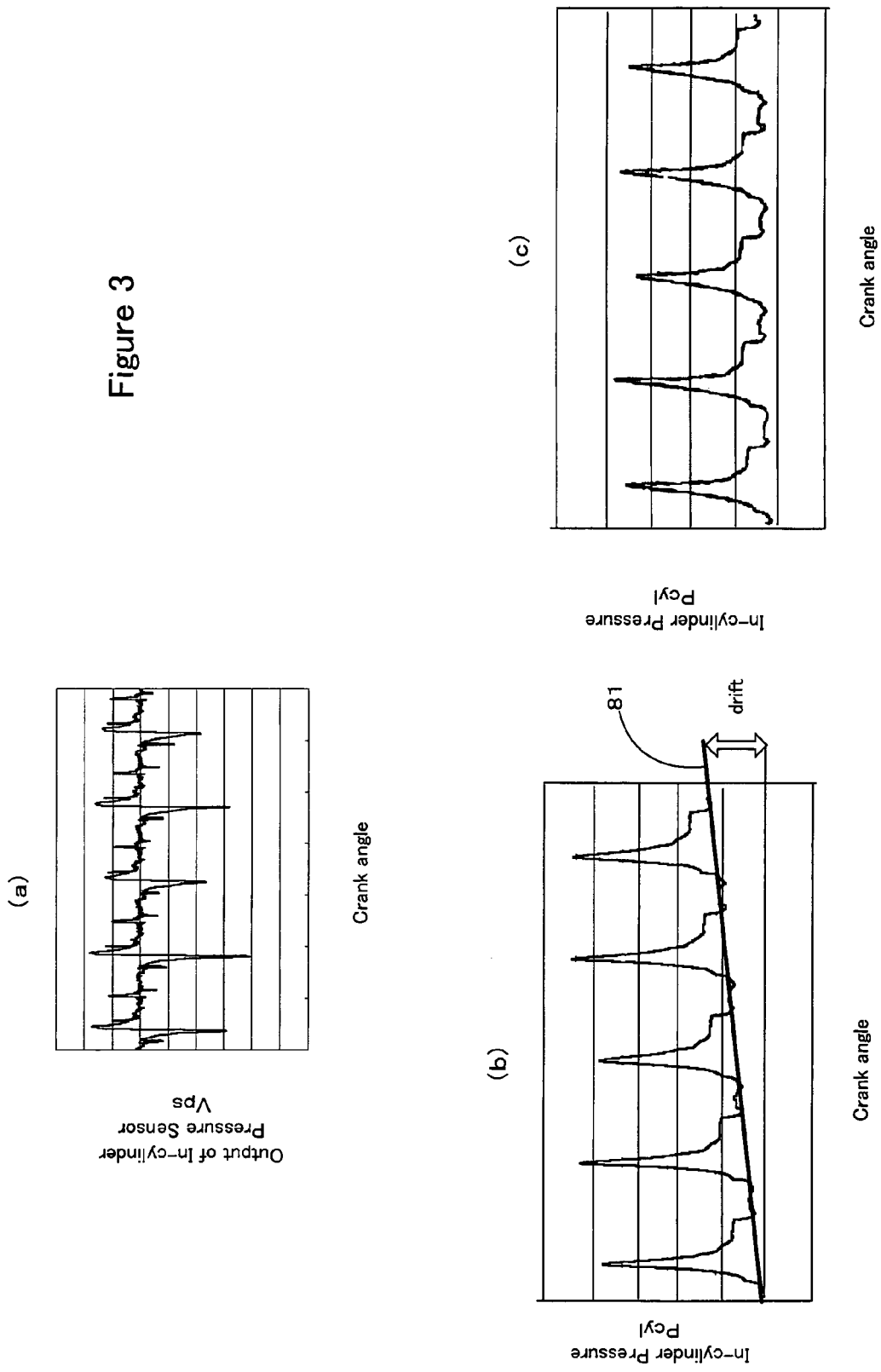
FIG. 3 schematically shows (a) an output of an in-cylinder pressure sensor, (b) a waveform of an in-cylinder pressure containing a drift and (c) a waveform of an in-cylinder pressure from which the drift has been removed in accordance with one embodiment of the present invention.

Referring to FIG. 3, the principles of a first and a second embodiments of the present invention will be described. FIG. 3(a) shows an output of the internal cylinder pressure sensor 15, that is, a rate of change Vps of the in-cylinder pressure.

The output Vps of the in-cylinder pressure sensor contains a drift component Δdft. The output Vps can be represented as shown by the equation (1).

$$Vps = Vps' + \Delta dft \quad (1)$$

The output Vps of the in-cylinder pressure sensor is integrated as shown in the equation (2) to detect an in-cylinder pressure. A waveform of the in-cylinder pressure Pcyl obtained by the integral is shown in FIG. 3(b). A drift caused by Δdft is appearing as shown by a line 81.

$$Pcyl = \int Vps = \int (Vps' + \Delta dft) dt \quad (2)$$

A rate of change Pcyl_comp of the drift 81 appearing in the in-cylinder pressure waveform shown in FIG. 3(*b*) is determined. The drift change rate Pcyl_comp is subtracted from the change rate Vps of the in-cylinder pressure shown in FIG. 3(*a*) to determine a drift-corrected change rate "Vps−Pcyl_comp" of the in-cylinder pressure. The drift-corrected change rate is integrated as shown by the equation (3).

$$Pcyl = \int (Vps - Pcyl\_comp)\,dt \quad (3)$$

The equation (4) is derived by substituting the equation (1) into the equation (3).

$$Pcyl = \int (Vps' + \Delta dft - Pcyl\_comp)\,dt \quad (4)$$

The drift component Δdft contained in the output of the in-cylinder pressure sensor represents the drift change rate. In other words, the drift component Δdft is equal to the drift change rate Pcyl_comp determined from the in-cylinder pressure. Therefore, the equation (4) is rewritten as in the equation (5).

$$Pcyl = \int Vps'\,dt \quad (5)$$

Thus, by integrating the value Vps' obtained by subtracting the drift change rate Pcyl_comp from the output Vps of the in-cylinder pressure sensor, the in-cylinder pressure Pcyl containing no drift component can be determined. A waveform of the in-cylinder pressure Pcyl containing no drift component is shown in FIG. 3(*c*).

As shown by the line 81 in FIG. 3(*b*), a drift almost linearly changes. Therefore, the drift change rate Pcyl_comp can be determined based on the line 81.

Now, the first and second embodiments in accordance with the present invention will be described. A "change rate" regarding the drift and the in-cylinder pressure represents the amount of change per predetermined time period. In the following embodiments, time is measured by using the crank angle. Therefore, each process for sampling and calculation is performed in synchronization with the crank angle.

Alternatively, time may be measured by using another parameter. For example, a timer or the like may be provided to perform each process at a predetermined time interval.

First Embodiment

FIG. 4 is a block diagram of an in-cylinder pressure detecting apparatus in accordance with a first embodiment of the present invention. Functions of the blocks shown in the figure can be implemented in the ECU 1. In one example, functions of the blocks are typically implemented by one or more computer programs stored in the memory 1c of the ECU 1. Alternatively, these functions may be implemented by software, hardware and firmware or any combination thereof.

The output of the in-cylinder pressure sensor 15 is converted from analog to digital and is input into the in-cylinder pressure detecting apparatus as Vps.

A correction unit 31 corrects the output Vps of the in-cylinder pressure sensor 15 (that is, the change rate of the in-cylinder pressure) by subtracting the drift change rate Pcyl_comp from the output Vps of the in-cylinder pressure sensor 15 (see the above-described equation (3)). An integrator 32 integrates the change rate Vps' thus corrected to determine the in-cylinder pressure Pcyl (see the above-described equation (5)). A drift change rate determination unit 33 determines the drift change rate Pcyl_comp based on the in-cylinder pressure Pcyl. The drift change rate Pcyl_comp is fed back to the correction unit 31 as a drift correction term.

This feedback operation is repeated at a predetermined time interval. Accordingly, the drift component Pcyl_comp is removed from the output Vps of the in-cylinder pressure sensor at every predetermined time interval. Since the output Vps' of the in-cylinder pressure sensor, from which a drift component has been removed, is integrated, it can be prevented that a drift appears in the waveform of the in-cylinder pressure obtained by the integral.

In the first embodiment, a process by the drift change rate determination unit 33 is carried out in a cycle of Tn. The length of Tn is equal to the length of one combustion cycle. Processes by the correction unit 31 and the integrator 32 are carried out in a cycle of Tk that is shorter than Tn. It is preferable that the length of Tk is set to be equal to the length of a cycle in which the A/D conversion of the output of the in-cylinder pressure sensor is performed. According to such setting of Tk, Vps can be corrected with the drift correction term Pcyl_comp every time the output of the in-cylinder pressure sensor is obtained as a digital value Vps.

Figure 6:
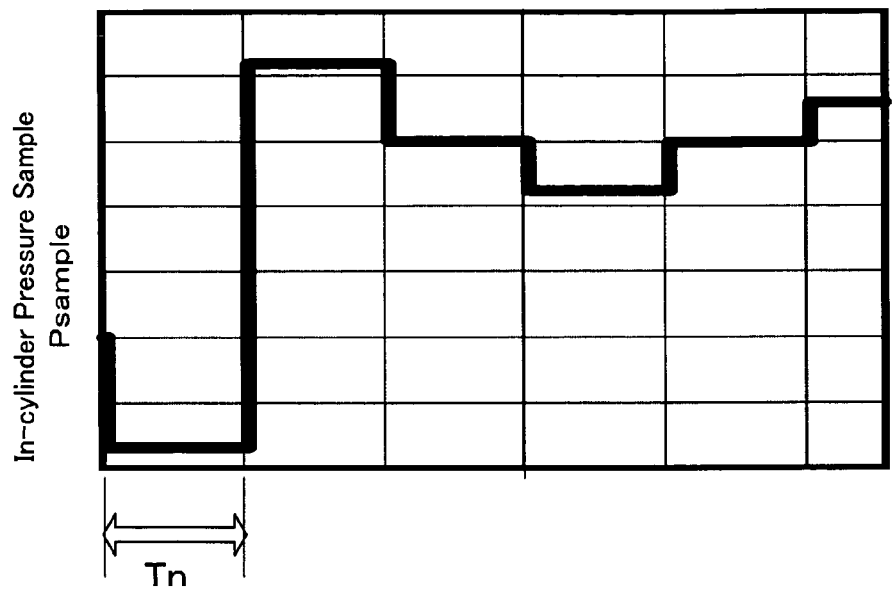
FIG. 6 shows a waveform of an in-cylinder pressure sample Psample in accordance with one embodiment of the present invention.

FIG. 5 is a detailed block diagram of one example of the drift change rate determination unit 33. Sampling by a sampling circuit 35 is performed in a cycle of Tn. The sampling circuit 35 samples the in-cylinder pressure Pcyl at a predetermined crank angle (CRK) in each combustion cycle. Preferably, the in-cylinder pressure Pcyl is sampled at a predetermined crank angle during the intake stroke of each combustion cycle. A sample Psample of the in-cylinder pressure obtained by such a sampling process is held in the sampling circuit 35 until the next sampling process. FIG. 6 shows a waveform of the in-cylinder pressure sample Psample held in the sampling circuit 35.

A drift amount determination circuit 36 determines the amount of drift Pdft by performing the equation (6) in response to generation of the in-cylinder pressure sample Psample by the sampling circuit 35.

$$Pdft = Psample - \text{reference value} \quad (6)$$

The reference value is established to represent an in-cylinder pressure when there exists no influence of a drift. For example, an output Pb of the intake manifold pressure sensor 20 that is sampled at the same timing as the sampling by the sampling circuit 35 is used as this reference value. Since the intake valve is open during the intake stroke, the in-cylinder pressure and the intake manifold pressure are equal if there exists no influence of a drift. In other words, a value obtained by subtracting the intake manifold pressure Pb from the in-cylinder pressure Pcyl represents the drift amount Pdft accumulated during the combustion cycle.

Alternatively, a pressure value that is determined based on an output of an airflow meter disposed in the intake manifold may be used as the reference value.

Figure 7:
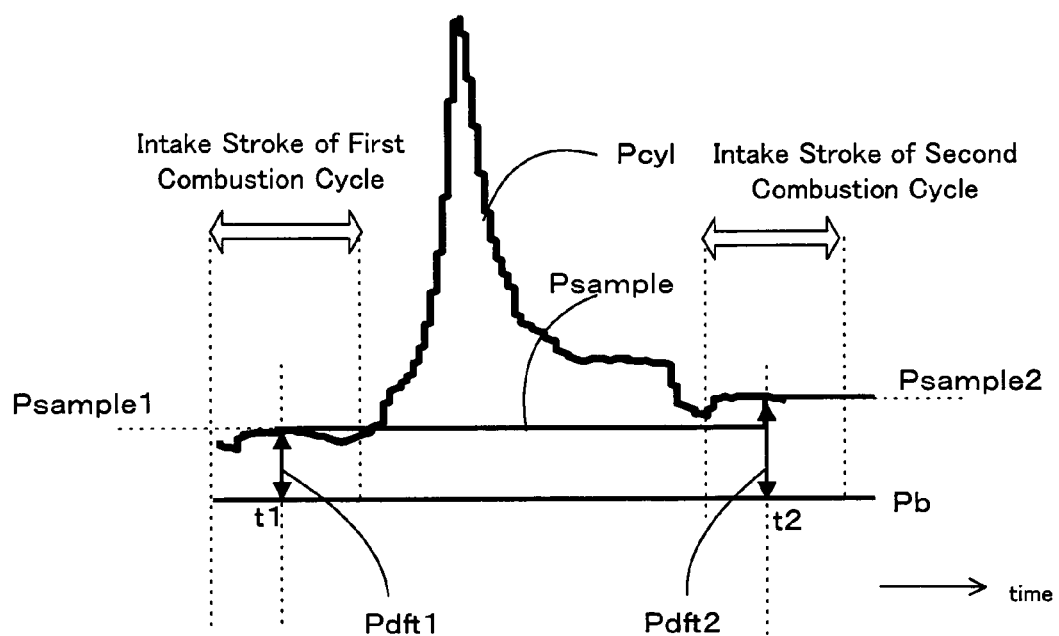
FIG. 7 shows a drift amount Pdft in accordance with one embodiment of the present invention.

FIG. 7 shows an example of the drift amount Pdft. The in-cylinder pressure sample Psample1, which has been sampled at time t1 during the intake stroke in the first combustion cycle, is held in the sampling circuit 35 until the next sample is obtained. A difference from the intake manifold pressure Pb that has been sampled at time t1 indicates a drift amount Pdft1 in the first combustion cycle. Similarly, the in-cylinder pressure sample Psample2, which has been sampled at time t2 during the intake stroke in the second combustion cycle, is held in the sampling circuit 35 until the next sample is obtained. A difference from the intake manifold pressure Pb that has been sampled at time t2 indicates a drift amount Pdft2 in the second combustion cycle. Thus, the drift amount Pdft is determined every combustion cycle.

Referring back to FIG. 5, a drift change rate determination circuit 37 performs the equation (7) to determine the drift change rate Pcyl_comp.

$$Pcyl\_comp = Pdft/\text{the number of times of sampling} \qquad (7)$$

where the number of times of sampling=length of one combustion cycle/Tk

In one example, as described above, Tk is equal to the length of a cycle in which the A/D conversion of the output of the in-cylinder pressure sensor is performed. Thus, the output Vps of the in-cylinder pressure sensor obtained every Tk can be corrected with the drift change rate Pcyl_comp per Tk.

Figure 8:
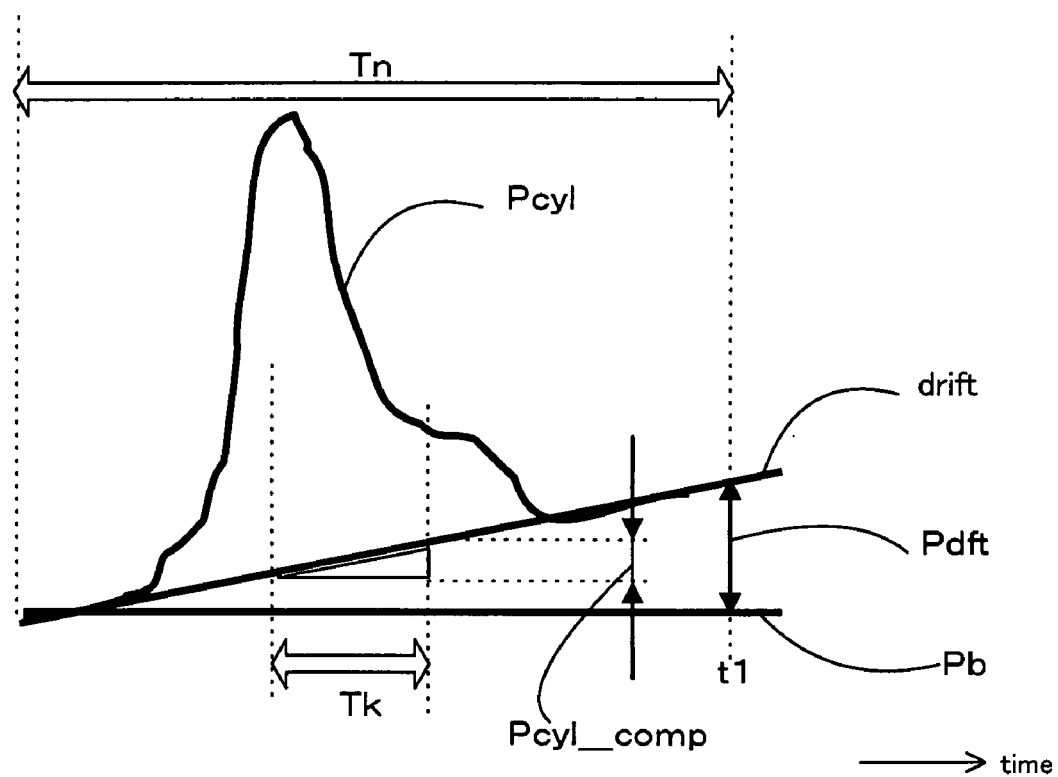
FIG. 8 shows a drift change rate Pcyl_comp in accordance with one embodiment of the present invention.

FIG. 8 shows the drift change rate Pcyl_comp. At time t1, the drift amount determination circuit 36 determines the drift amount Pdft. By dividing the drift amount Pdft by the number of times of sampling, the drift change rate Pcyl_comp per Tk is determined. The drift change rate Pcyl_comp thus determined is fed back to the correction unit 31 (FIG. 4) as the drift correction term.

Figure 9:
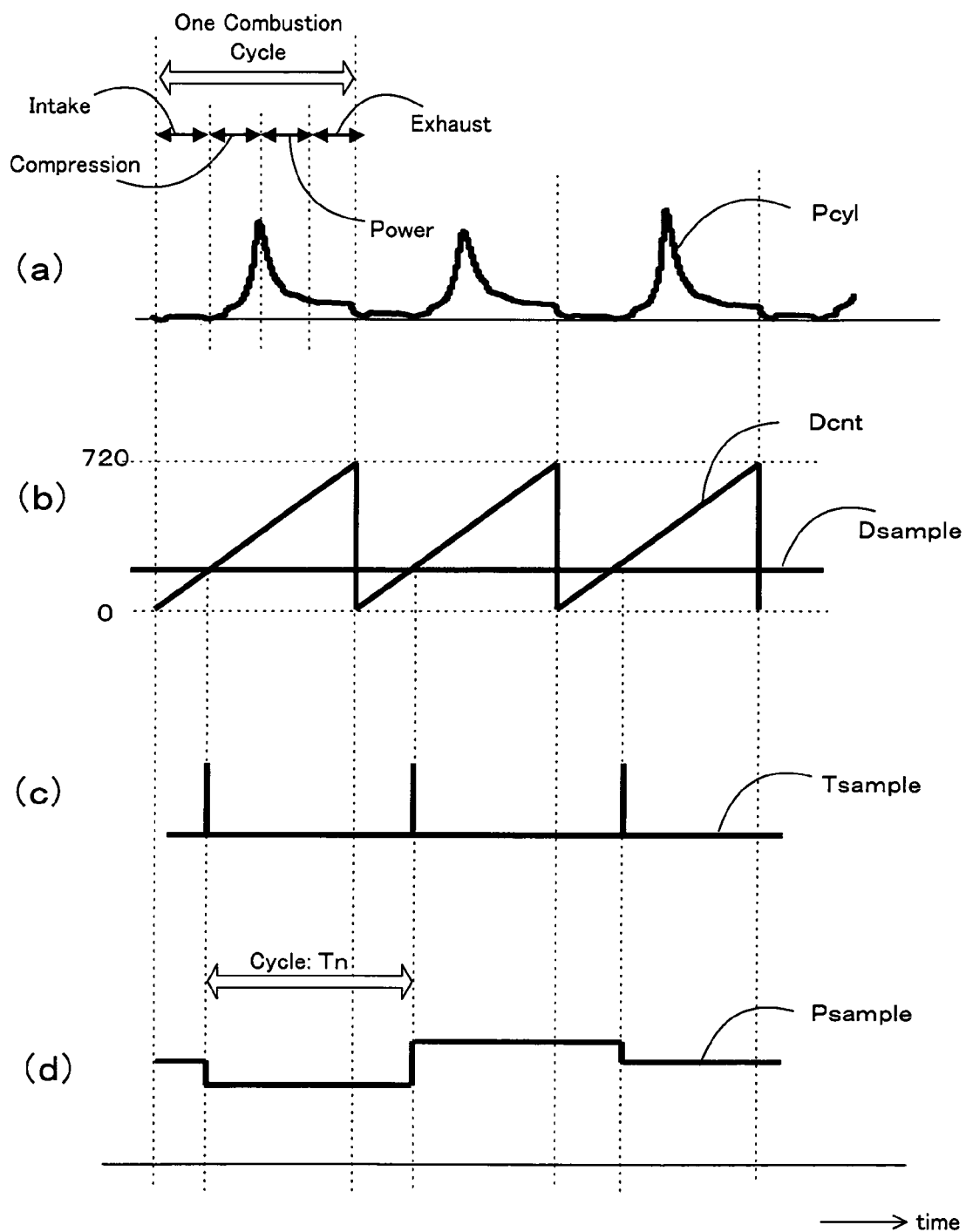
FIG. 9 shows a scheme for sampling an in-cylinder pressure Pcyl in accordance with one embodiment of the present invention.

FIG. 9 shows a detailed operation of the sampling circuit 35 of FIG. 5. FIG. 9(a) shows the in-cylinder pressure Pcyl generated by the integrator 32.

An up counter is provided in the sampling circuit 35. Dcnt indicates the value of the counter as shown in FIG. 9(b). The up counter is reset to zero at the starting time of the intake stroke of each combustion cycle, namely, when the crank angle is zero. The up counter counts in accordance with a crank signal from the crank angle sensor 17 (FIG. 1).

In one example, a crank signal is output for each rotation of the crankshaft. The crank signal is output 720 times during one combustion cycle. Therefore, the counter counts from 0 to 720 in each combustion cycle.

FIG. 9(b) also shows the waveform representing a crank angle Dsample, at which the in-cylinder pressure Pcyl is to be sampled. The crank angle Dsample is predetermined. The sampling circuit 35 compares the value Dcnt of the up counter with the crank angle Dsample.

As shown in FIG. 9(c), if the value Dcnt of the up counter is equal to the crank angle Dsample, a sampling signal Tsample having a predetermined value (for example, 1) is generated. If the value Dcnt of the up counter is not equal to the predetermined value Dsample, the sampling signal Tsample having a value of zero is generated.

As shown in FIG. 9(d), the sampling circuit 35 samples the in-cylinder pressure Pcyl in response to the generation of the sampling signal Tsample having the predetermined value to obtain the in-cylinder pressure sample Psample. While the sampling signal Tsample is zero, the in-cylinder pressure sample Psample is held in the sampling circuit 35. As described above, the in-cylinder pressure sample Psample is obtained in a cycle of Tn that is equal to the length of the combustion cycle.

Figure 10:
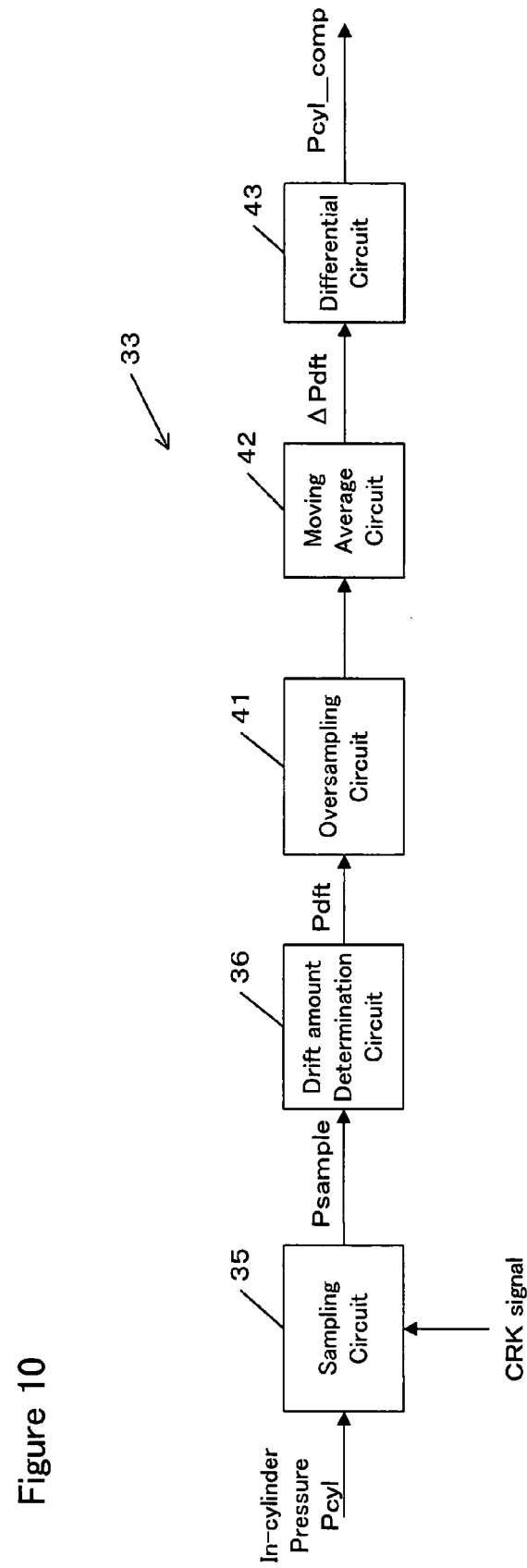
FIG. 10 is a block diagram of another example of a drift change rate determination unit in accordance with one embodiment of the present invention.

FIG. 10 is a detailed block diagram of another example of the drift change rate determination unit 33 shown in FIG. 4. The sampling circuit 35 and the drift amount determination circuit 36 are the same as shown in FIG. 5. The drift change rate determination unit shown in FIG. 10 differs from that shown in FIG. 5 in the way to determine the drift change rate Pcyl_comp based on the drift amount Pdft.

Figure 11:
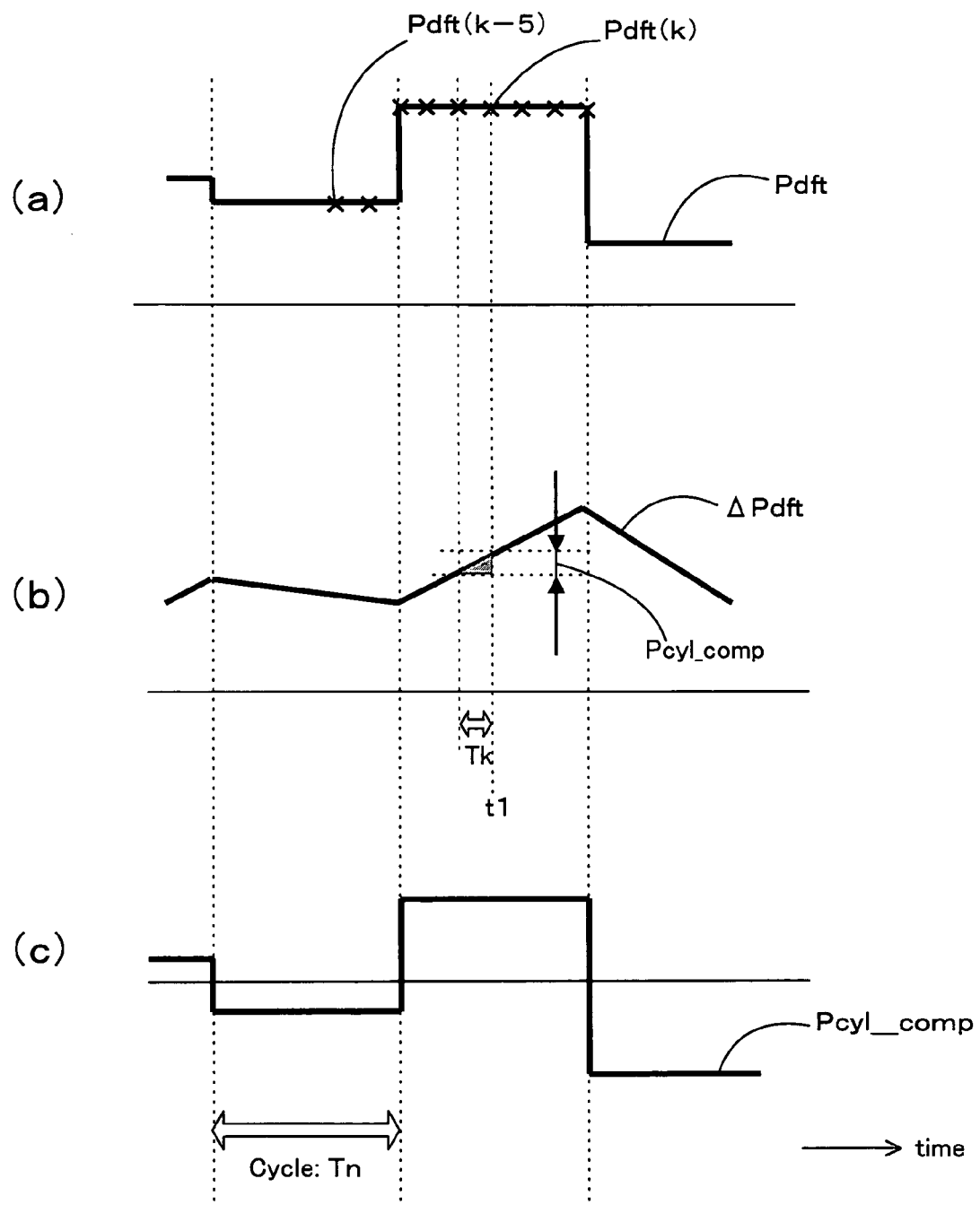
FIG. 11 shows a drift change rate Pcyl_comp in accordance with one embodiment of the present invention.

According to the drift change rate determination unit 33 shown in FIG. 10, the drift change rate Pcyl_comp is determined through a series of operations including oversampling, moving average and differentiation. These operations will be described referring to FIG. 11.

FIG. 11(a) shows a waveform of the drift amount Pdft determined by the drift amount determination circuit 36 in each combustion cycle (that is, in a cycle of Tn). An oversampling circuit 41 oversamples the drift amount Pdft in a cycle of Tk.

The number of times of sampling "m" in one combustion cycle is calculated by "length of one combustion cycle/Tk". FIG. 11(a) shows an example in the case of m=6.

A moving average circuit 42 averages the samples Pdft (k−(m−1)) to Pdft(k) in accordance with the equation (8) every time a sample value is obtained by the oversampling. "k" indicates a cycle number. Thus, a drift amount ΔPdft per Tk is calculated.

$$\Delta Pdft(k) = \frac{Pdft(k-(m-1)) + Pdft(k-(m-2)) + \ldots, +Pdft(k-1)) + Pdft(k)}{m} \qquad (8)$$

The drift amount ΔPdft thus determined can be expressed by a line shown in FIG. 11(b). The drift amount ΔPdft indicates the amount of drift accumulated over Tk. Therefore, by determining the slope of the line shown in FIG. 11(b), in other words, by differentiating the drift amount ΔPdft, the drift change rate Pcyl_comp is determined.

As one example, the drift change rate Pcyl_comp calculated at time t1 in the case of m=6 is shown in the figure. This drift change rate Pcyl_comp is calculated by differentiating ΔPdft generated by applying the moving average to the samples Pdft(k−5) to Pdft(k). Thus, by calculating the drift change rate Pcyl_comp in a cycle of Tk, the waveform as shown in FIG. 11(c) is obtained. The calculated drift change rate Pcyl-comp is fed back to the correction unit 31 (FIG. 4) as the drift correction term.

As described above, Tk is equal to the length of a cycle in which the A/D conversion of the output of the in-cylinder pressure sensor is performed. Thus, the output Vps of the in-cylinder pressure sensor obtained in a cycle of Tk can be corrected with the drift change rate Pcyl_comp per Tk.

In this example, the moving average is applied to the oversampled values. Alternatively, another filtering (for example, a low-pass filter) may be used instead of the moving average.

In the embodiment, the drift amount Pdft is determined by subtracting the reference value Pb from the in-cylinder pressure Pcyl. Alternatively, the in-cylinder pressure Pcyl during an intake stroke may be used as the drift amount Pdft, because it can be regarded that a pressure detected by the in-cylinder pressure sensor during the intake stroke (especially, around the starting time of the intake stroke) is caused by a drift. However, by using the reference value, especially by setting the intake manifold pressure Pb in the reference value, the drift amount Pdft can be more accurately determined and the accuracy of the absolute value of the in-cylinder pressure Pcyl after the drift correction can be improved.

Second Embodiment

Figure 12:
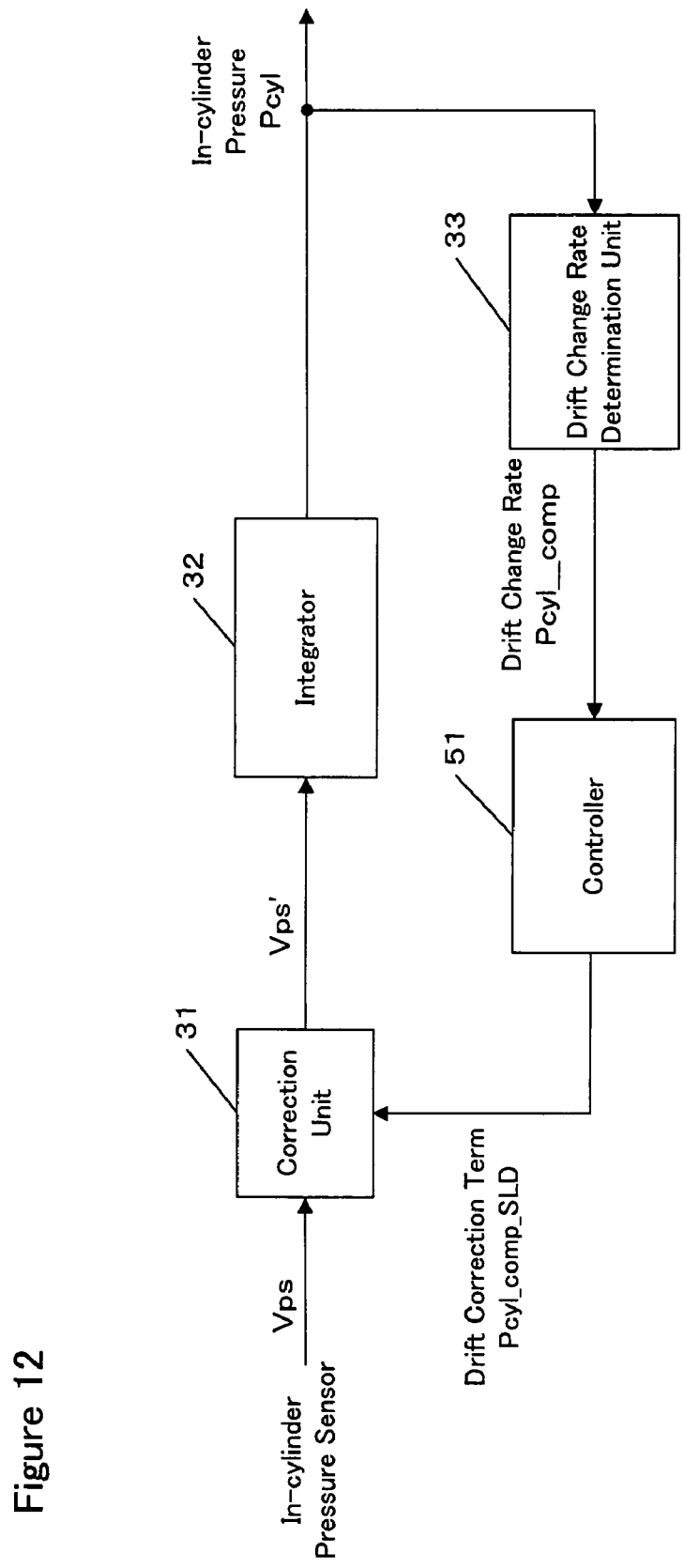
FIG. 12 is a block diagram of an in-cylinder pressure detecting apparatus in accordance with another embodiment of the present invention.

FIG. 12 is a block diagram of an in-cylinder pressure detecting apparatus in accordance with a second embodiment of the present invention. As is the case for the first embodiment, the in-cylinder pressure detecting apparatus according to the second embodiment can be implemented in the ECU 1.

The second embodiment differs from the first embodiment shown in FIG. 4 in that a controller 51 is provided between the correction unit 31 and the drift change rate determination unit 33. The drift change rate determination unit 33 can be implemented in accordance with FIG. 5 or FIG. 10.

The controller 51 determines a drift correction term Pcyl_comp_SLD so that the drift change rate Pcyl_comp received from the drift change rate determination unit 33 converge to a desired value Pcyl_comp_cmd (which is zero in this embodiment). This drift correction term Pcyl_comp_SLD is input into the correction unit 31 as a control input. The correction unit 31 corrects the output Vps of the in-cylinder pressure sensor by adding the drift correction term Pcyl_comp_SLD to the output Vps of the in-cylinder pressure sensor. The integrator 32 integrates the output Vps' thus corrected to determine the in-cylinder pressure Pcyl.

In the embodiment, the controller 51 carries out a response assignment control in a cycle of Tn that is equal to the length of the combustion cycle to cause the drift change rate Pcyl_comp to converge. Alternatively, a response assignment control may be carried out in a cycle of Tk so as to adapt to the cycle in which the drift change rate Pcyl_comp is determined.

The response assignment control is a control that is capable of specifying a speed that a controlled variable (which is the drift change rate Pcyl_comp in this embodiment) converges to a desired value. According to the response assignment control, the drift change rate Pcyl_comp can converge to zero at a desired speed without overshooting. In this embodiment, a simplified version of sliding mode control is used as a response assignment control.

Figure 13:
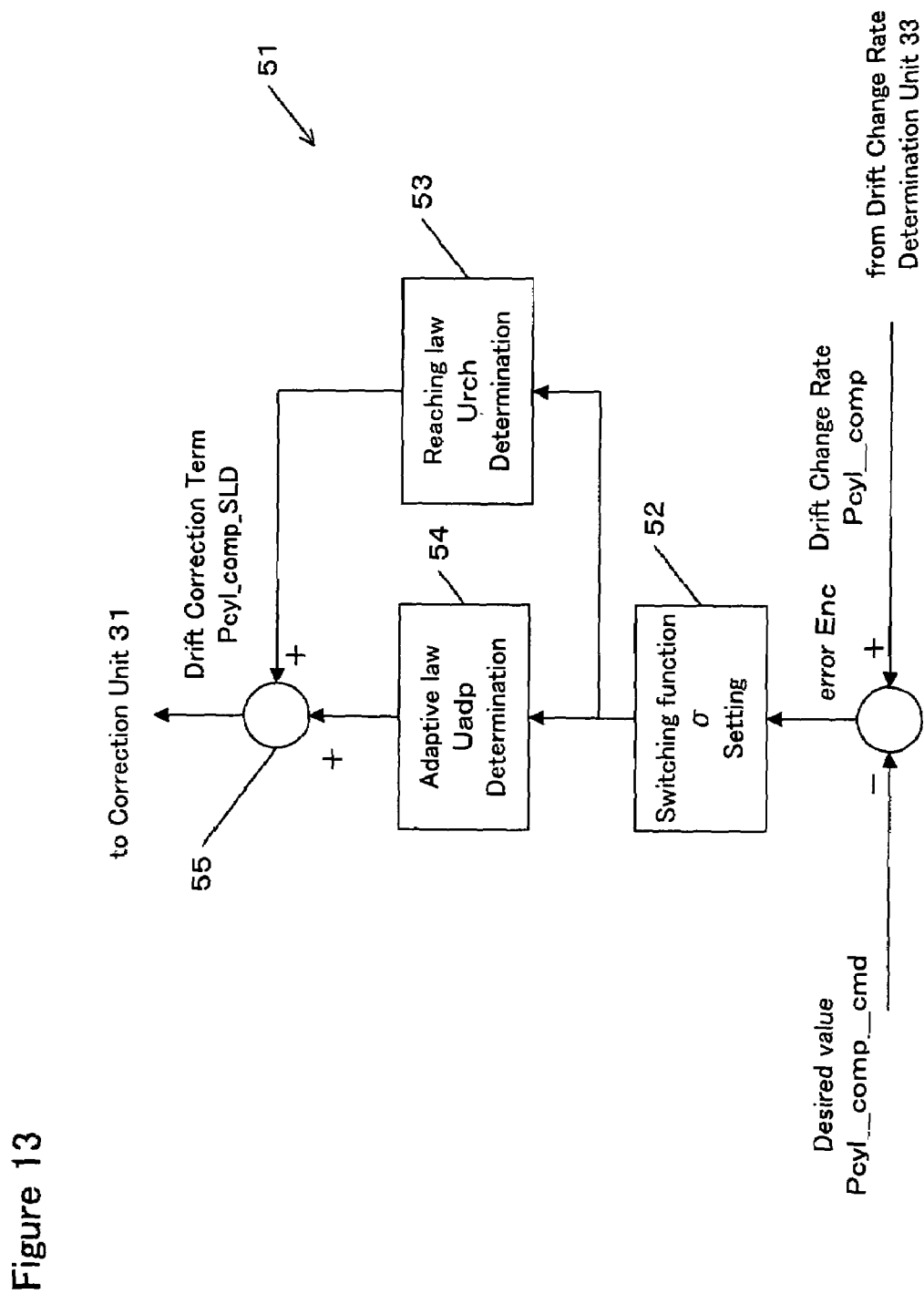
FIG. 13 is a block diagram of a controller in accordance with another embodiment of the present invention.

FIG. 13 shows detailed functional blocks of the controller 51. A switching function setting unit 52 establishes a switching function σ as shown in the equation (9). Enc represents an error between the drift change rate Pcyl_comp and the desired value Pcyl_comp_cmd as shown in the equation (10). k indicates a cycle number.

$$\sigma(k) = Enc(k) + POLE \times Enc(k-1) \quad (9)$$

$$Enc(k) = Pcyl\_comp(k) - Pcyl\_comp\_cmd(k) \quad (10)$$

POLE is a response assignment parameter and specifies the convergence speed of the drift change rate Pcyl_comp. The response assignment parameter POLE is preferably set to satisfy $-1 < POLE < 0$.

A system in which the switching function σ(k)=0 is called an equivalent input system and specifies convergence characteristics of the drift change rate. Assuming σ(k)=0, the equation (9) can be expressed as shown by the equation (11).

$$Enc(k) = -POLE \times Enc(k-1) \quad (11)$$

Figure 14:
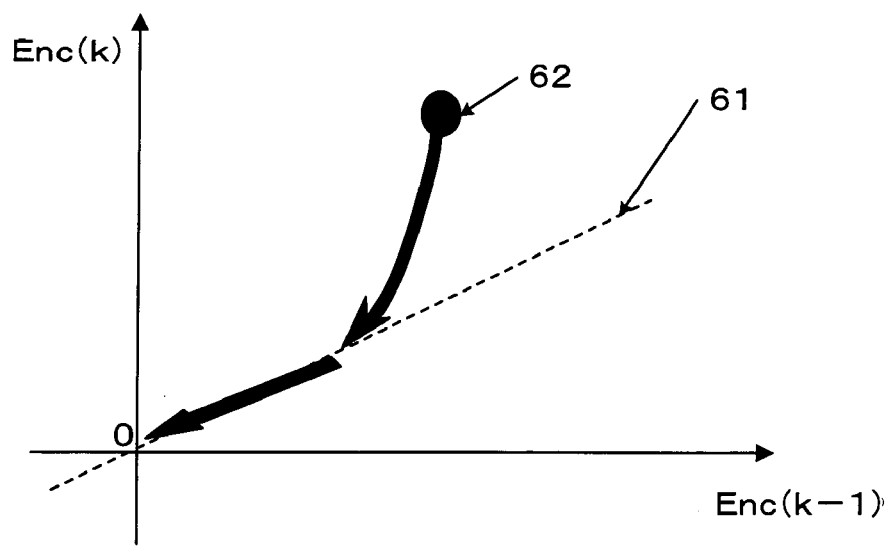
FIG. 14 schematically shows a switching function of a response assignment control in accordance with another embodiment of the present invention.

Now, the switching function will be described referring to FIG. 14. The equation (11) is shown by a line 61 in a phase plane with Enc(k) on the vertical axis and Enc(k−1) on the horizontal axis. This line 61 is referred to as a switching line. Assuming that a point 62 indicates an initial value of a state quantity (Enc(k−1), Enc(k)), which is a combination of Enc(k−1) and Enc(k), the response assignment control places the state quantity shown by the point 62 on the switching line 61 and then constrains it on the switching line 61.

According to the response assignment control, since the state quantity 62 is held on the switching line 61, the state quantity can stably converge to the origin 0 of the phase plane without being influenced by disturbance or the like. In other words, by constraining the state quantity (Enc(k−1), Enc(k)) within such a stable system having no input as shown by the equation (11), the error Enc can converge to zero robustly against disturbance.

Since the phase plane regarding the switching function σ has two dimensions in this embodiment, the switching line is represented by a straight line 61. When the phase plane has three dimensions, the switching line is represented by a plane. When the phase plane has four or more dimensions, the switching line is represented by a hyperplane.

The response assignment parameter POLE can be variably set. The convergence speed of the error Enc can be specified by adjusting the response assignment parameter POLE.

Figure 15:
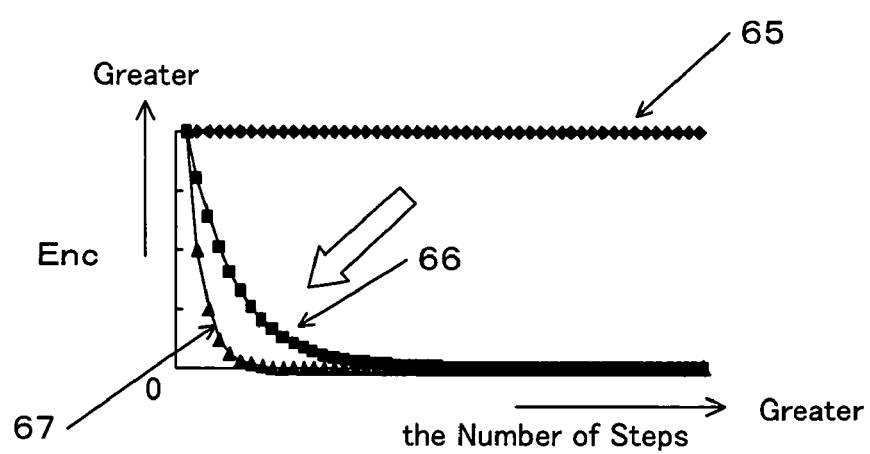
FIG. 15 schematically shows a response assignment parameter of a response assignment control in accordance with another embodiment of the present invention.

Referring to FIG. 15, reference numerals 65, 66 and 67 show the convergence speed of the error Enc when the response assignment parameter POLE takes a value of −1, −0.8 or −0.5, respectively. The convergence speed of the error Enc increases as the absolute value of the response assignment parameter POLE decreases.

Referring back to FIG. 13, a reaching law determination unit 53 determines a reaching law input Urch which is represented by a proportional term of the switching function σ as shown in the equation (12). The reaching law input Urch is an input for placing the state quantity on the switching line. An adaptive law determination unit 54 determines an adaptive law input Uadp which is represented by an integral term of the switching function a as shown in the equation (13). The adaptive law input Uadp is an input for constraining the state quantity on the switching line while suppressing a steady-state error. Krch and Kadp are feedback gains that are to be predetermined by simulation or the like. An adder 55 adds the reaching law input Urch and the adaptive law input Uadp as shown in the equation (14). Thus, the control input Pcyl_comp_SLD is determined.

$$Urch = -Krch \cdot \sigma(k) \quad (12)$$

$$Uadp = -Kadp \cdot \sum_{i=0}^{k} \sigma(i) \quad (13)$$

$$Pcyl\_comp\_SLD = Urch + Uadp \quad (14)$$

Figure 16:
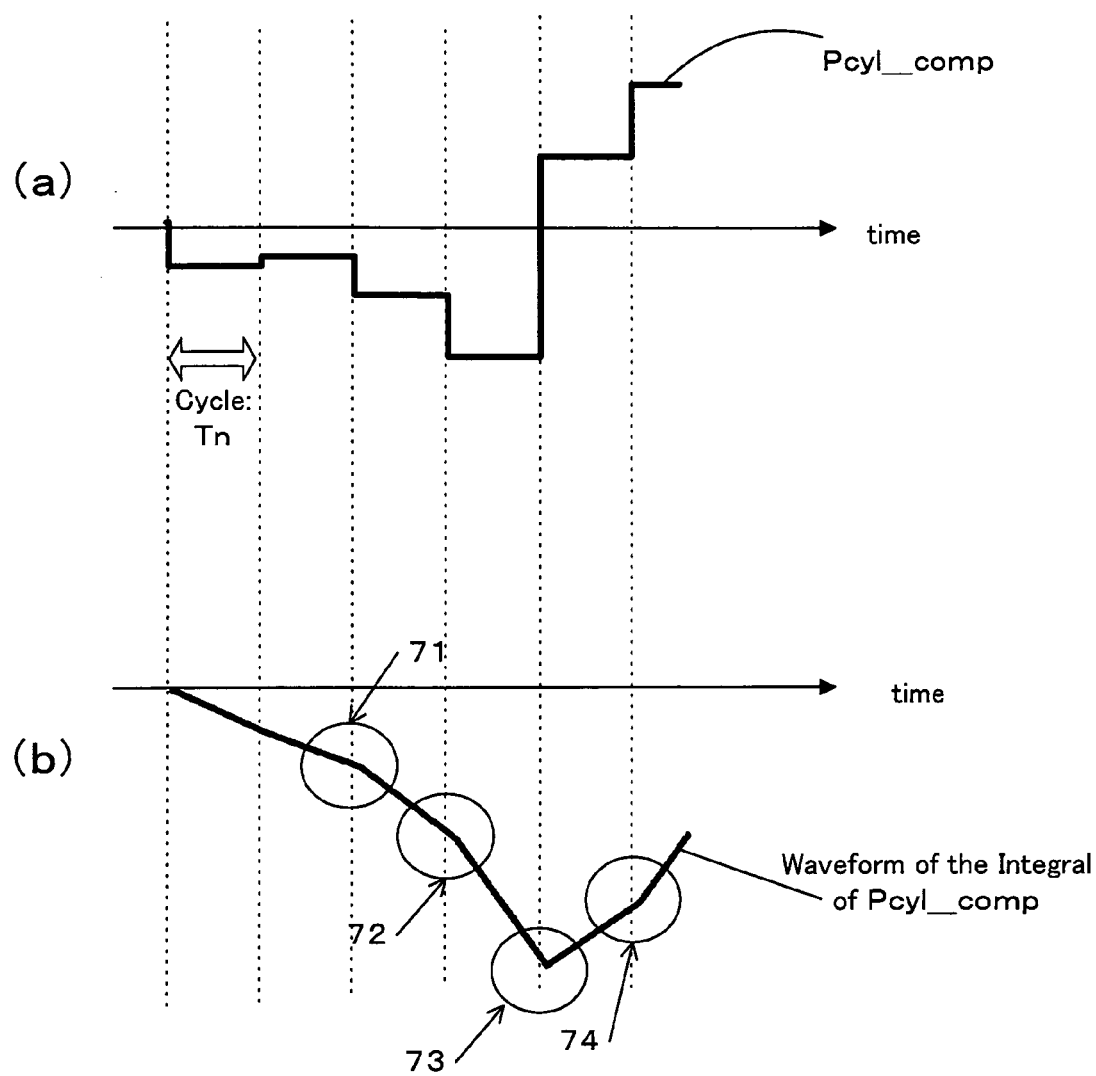
FIG. 16 schematically shows discontinuity of a drift change rate when a response assignment control is not used in accordance with one embodiment of the present invention.
Figure 17:
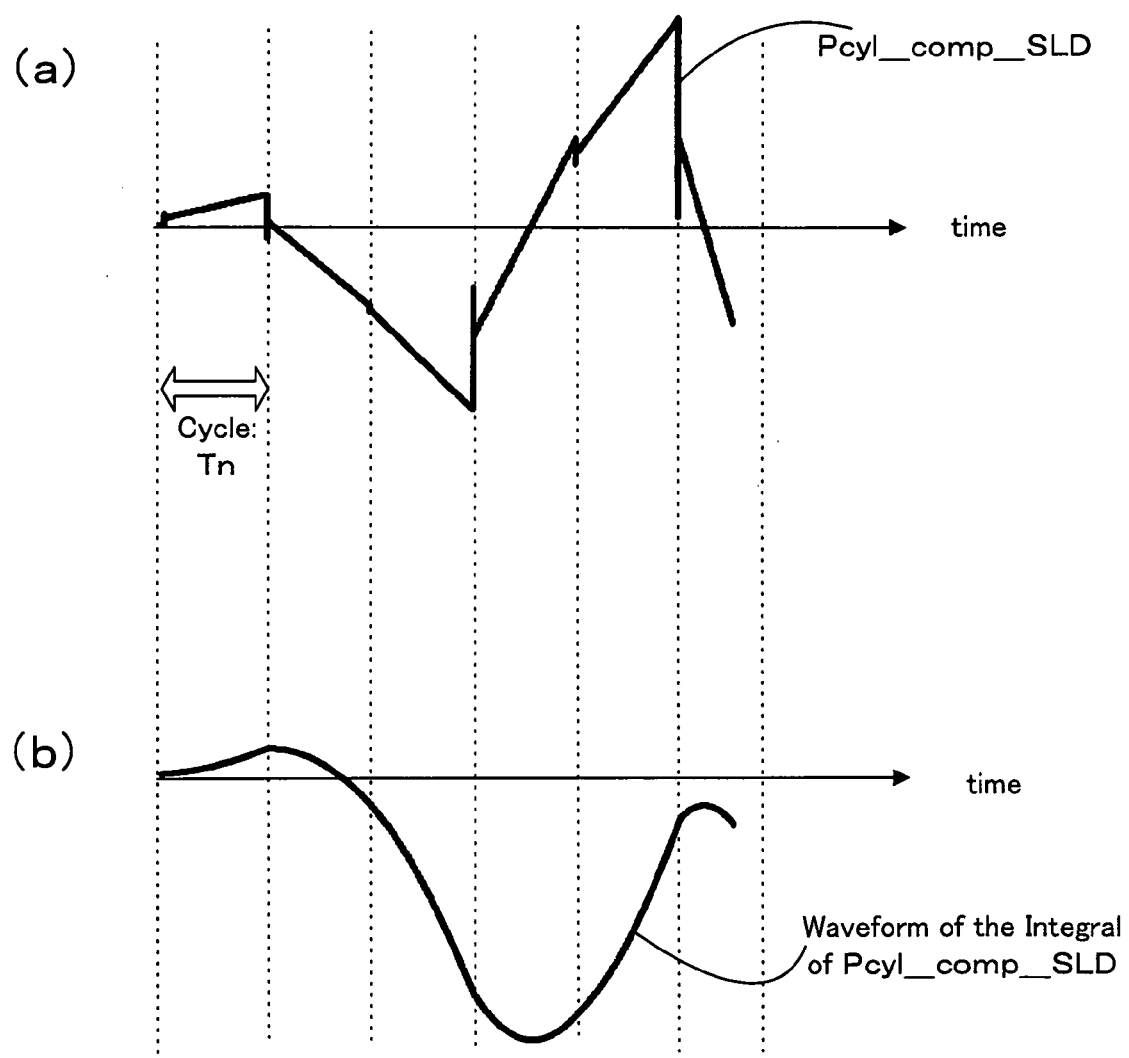
FIG. 17 schematically shows continuity of a drift change rate when a response assignment control is used in accordance with another embodiment of the present invention.

Referring to FIG. 16 and FIG. 17, the effect of using the response assignment control will be described. FIG. 16(a) shows a waveform of the drift change rate Pcyl_comp determined by the drift change rate determination unit 33. As described above, the drift change rate Pcyl_comp can be determined by the drift change rate determination unit 33 shown in FIG. 5 or FIG. 10. FIG. 16(b) shows a waveform obtained by integrating the drift change rate Pcyl_comp shown in FIG. 16(a). It is seen that discontinuity appears between operation cycles of the drift change rate as shown by reference numerals 71 to 74. This discontinuity is generated because the drift amount Pdft is calculated every combustion cycle (in other words, because the calculated drift change rate Pcyl_comp is constant over Tn). If the output Vps of the in-cylinder pressure sensor is corrected with such drift change rate Pcyl_comp, such discontinuity as shown in FIG. 16(b) may appear in the waveform of the in-cylinder pressure generated by the integrator 32. This is undesirable in a subsequent process such as a frequency resolution process of the in-cylinder pressure. The response assignment control can remove such discontinuity.

FIG. 17(a) shows Pcyl_comp_SLD determined by the controller 51 as the drift correction term. FIG. 17(b) shows a waveform obtained by integrating the drift correction term Pcyl_comp_SLD shown in FIG. 17(a). Since the drift correction term Pcyl_comp_SLD is determined to gradually approach zero by the response assignment control, the value obtained by integrating the drift correction term Pcyl_comp_SLD is represented by a continuous waveform. Since the integral of the drift correction term Pcyl_comp_SLD has no discontinuity, it is prevented that discontinuity appears in the waveform of the in-cylinder pressure.

Figure 18:
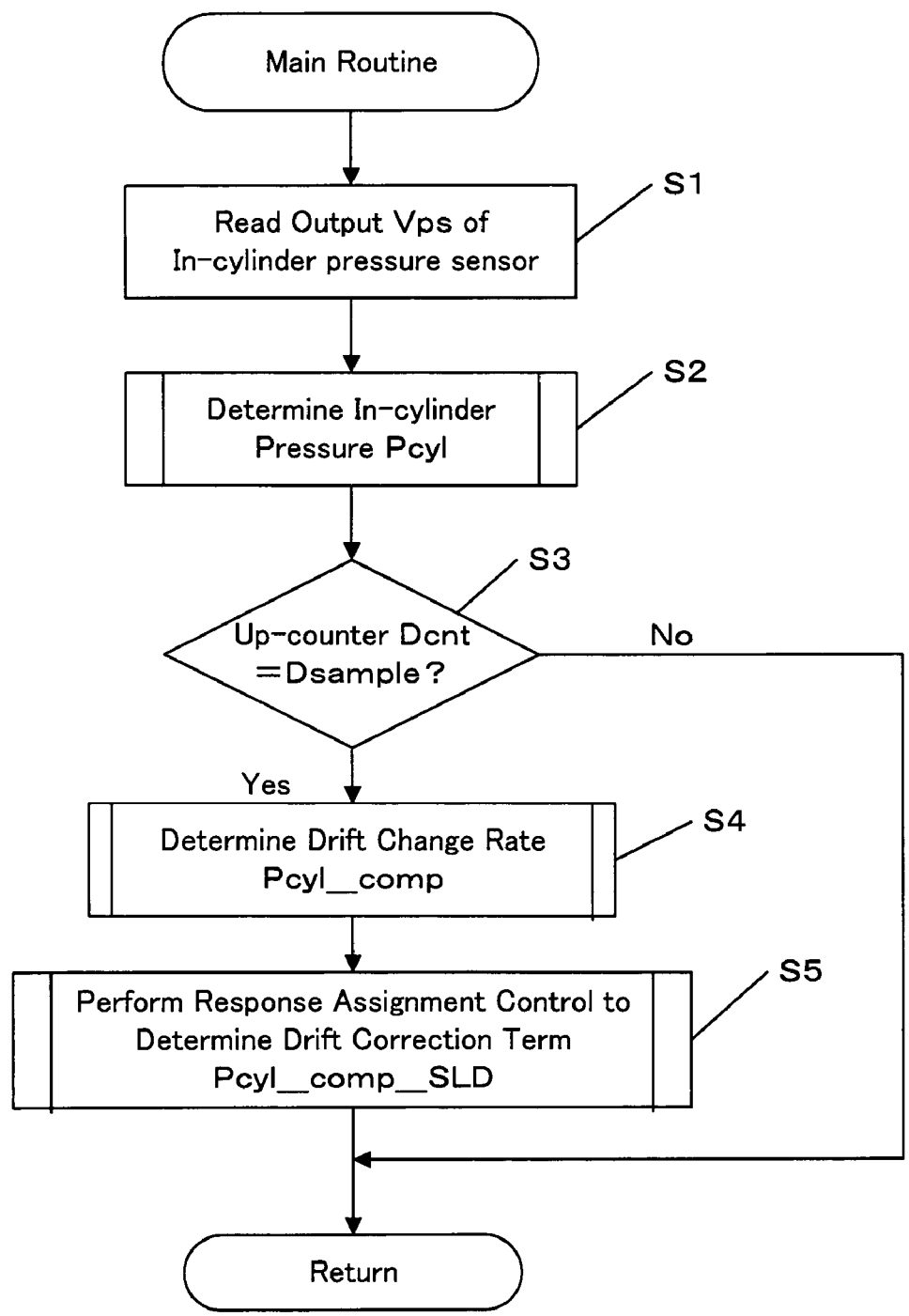
FIG. 18 is a flowchart of a main routine for detecting an in-cylinder pressure in accordance with another embodiment of the present invention.

FIG. 18 is a flowchart of a process for detecting the in-cylinder pressure in accordance with the second embodiment described above. Calculation of the drift change rate Pcyl_comp is implemented by the drift change rate determination unit 33 of FIG. 5. The detection process is carried out in a cycle of Tk.

In step S1, the output Vps of the in-cylinder pressure sensor 15 is read (in other words, the output of the in-cylinder pressure sensor 15 is sampled to obtain a digital value Vps). In step S2, the output Vps' of the in-cylinder pressure sensor, which has been corrected with the drift correction term Pcyl_comp_SLD, is integrated to determine the in-cylinder pressure Pcyl.

In step S3, it is determined whether the value Dcnt of the up counter has reached the predetermined crank angle Dsample at which the in-cylinder pressure is to be sampled (see FIG. 9). If the decision of step S3 is not affirmative, the process exits this routine because the time for sampling the in-cylinder pressure has not yet come.

If the decision of step S3 is affirmative, the process proceeds to step S4, in which the in-cylinder pressure Pcyl is sampled and the drift change rate Pcyl_comp is determined. In step S5, a simplified version of the response assignment control is performed to determine the drift correction term Pcyl_comp_SLD.

Figure 19:
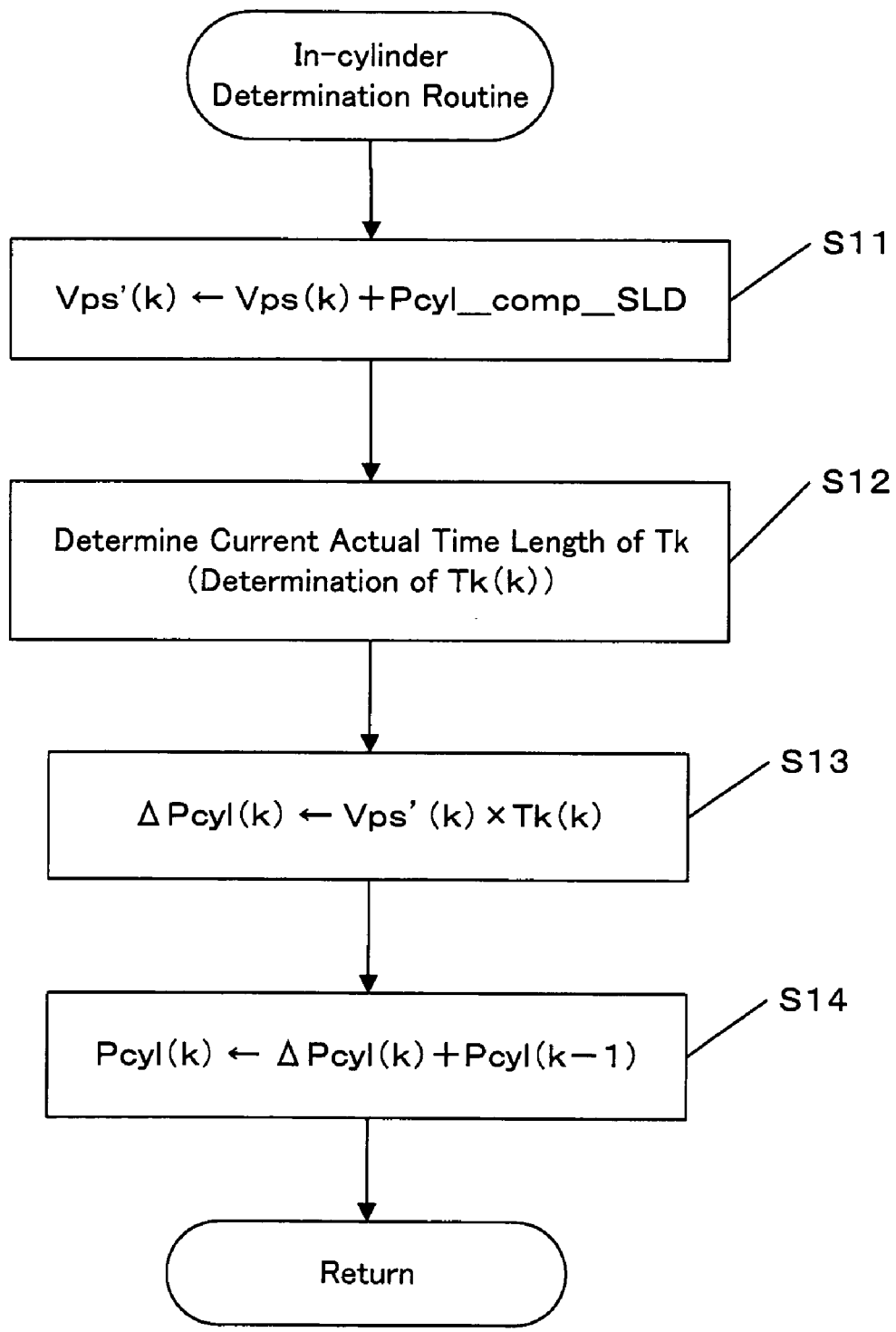
FIG. 19 is a flowchart of a process for determining an in-cylinder pressure Pcyl in accordance with another embodiment of the present invention.

FIG. 19 is a flowchart of the process in step S2. In step S11, the drift correction term Pcyl_comp_SLD is added to the output Vps of the in-cylinder pressure sensor to determine the corrected output Vps' of the in-cylinder pressure sensor.

In step S12, the current actual time length (seconds) of Tk is calculated. In this embodiment, as described above, the time is measured by using the crank angle. For example, the process in "a cycle of Tk" is performed "every time the crank angle advances by D degrees (for example, 0.25 degrees)". The time length corresponding to D actually changes in accordance with the engine rotational speed. Therefore, it is preferable that, in each cycle, the actual time length of Tk is calculated based on the detected engine rotational speed. The in-cylinder pressure is calculated based on the time length thus calculated.

When the currently detected engine rotational speed NE(k) indicates the crankshaft rotational speed per minute, the crankshaft rotational speed per second is NE(k)/60. On the other hand, if the output Vps of the in-cylinder pressure sensor is sampled every time the crank angle advances D degrees, the number of times of sampling per one rotation of the crankshaft is 360/D. Accordingly, the frequency H (Hz) of sampling the output Vps of the in-cylinder pressure sensor is shown by the equation (15).

$$H=(NE(k)\times 360/D)/60=(6\times NE(k))/D \quad (15)$$

The current actual time length Tk(k) is calculated by the equation (16).

$$Tk(k)=1/H=D/(6\times NE(k)) \quad (16)$$

where Tk(k) is expressed in seconds.

Steps S13 and S14 show an integral process for the in-cylinder pressure Pcyl. In step S13, the amount of change ΔPcyl of the in-cylinder pressure per Tk(k) is calculated. Since the sampling cycle for the output Vps of the in-cylinder pressure sensor is Tk(k), the change amount ΔPcyl of the in-cylinder pressure per Tk(k) is calculated as shown by the equation (17). By using the current actual time length of Tk, the change amount ΔPcyl of the in-cylinder pressure Pcyl can be more accurately calculated.

$$\Delta Pcyl(k)=Vps'(k)\times Tk(k) \quad (17)$$

In step S14, the current value Pcyl(k) of the in-cylinder pressure is calculated by adding the change amount ΔPcyl of the in-cylinder pressure per Tk(k) (which is calculated in step S13) to the previous value Pcyl(k−1) of the in-cylinder pressure.

Alternatively, the sampling of the in-cylinder pressure may be performed at a predetermined time interval, rather than in synchronization with the crank angle. If the sampling is performed at a predetermined time interval, the process in step S12 is not required.

Alternatively, the sampling of the in-cylinder pressure may be performed in synchronization with another parameter. In this case, it is also preferable that the change amount ΔPcyl of the in-cylinder pressure is calculated in consideration of the current actual time length of Tk.

Figure 20:
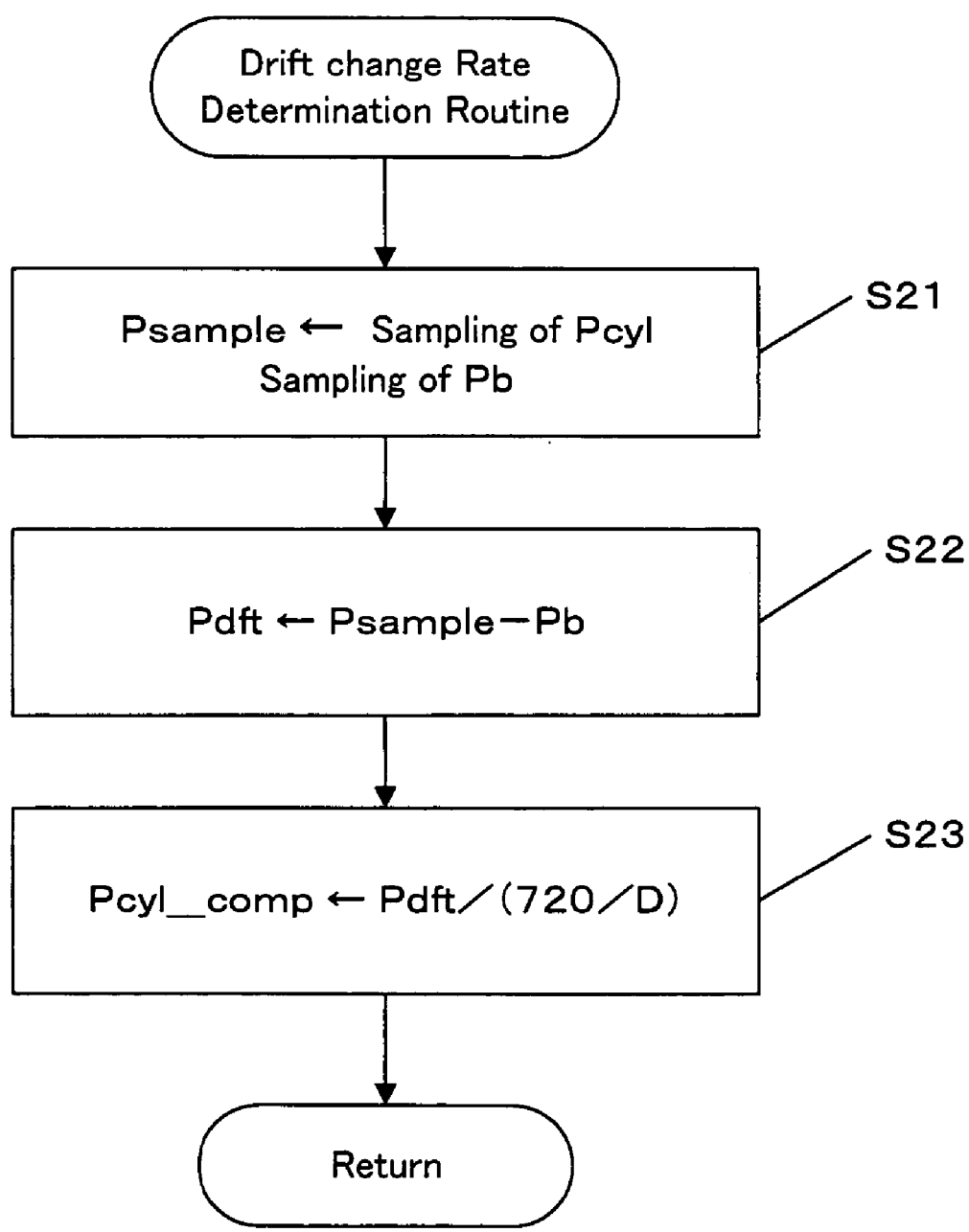
FIG. 20 is a flowchart of a process for determining a drift change rate Pcyl_comp in accordance with another embodiment of the present invention.

FIG. 20 shows a flowchart of the process in step S4. In step S21, the in-cylinder pressure Pcyl is sampled to obtain a sample Psample of the in-cylinder pressure. The output Pb from the intake manifold pressure sensor is also sampled. In step S22, a difference between the in-cylinder pressure sample Psample and the intake manifold pressure Pb is calculated as the drift amount Pdft.

In step S23, the drift amount Pdft is divided by the number of times of sampling to calculate the drift change rate Pcyl_comp. In this embodiment, as described above referring to the equation (15), the crank angle corresponding to one combustion cycle is 720 degrees and the crank angle corresponding to Tk is D. Therefore, from the equation (7), the number of times of sampling is 720/D.

Figure 21:
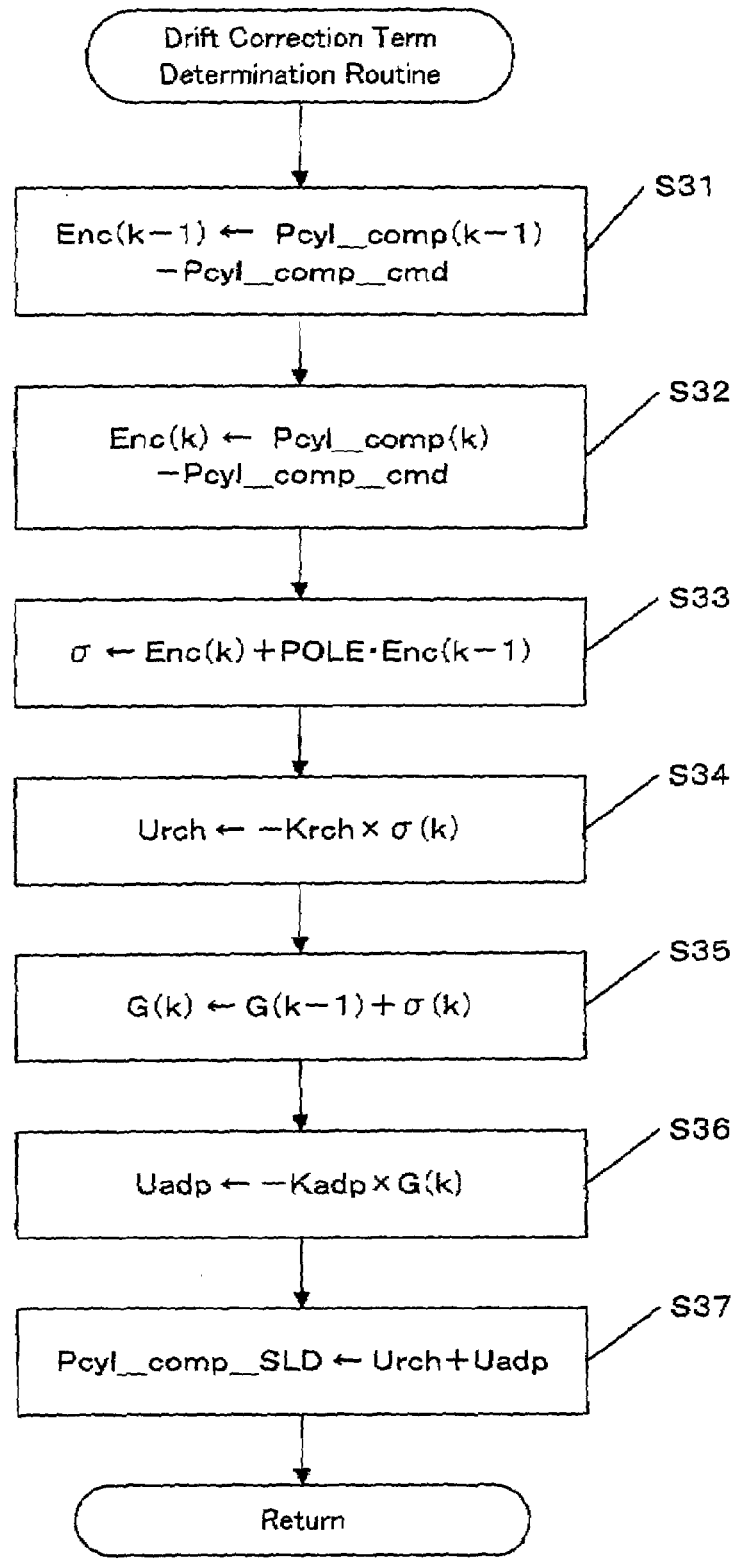
FIG. 21 is a flowchart of a process for determining a drift correction term Pcyl_comp_SLD in accordance with another embodiment of the present invention.

FIG. 21 shows a flowchart of the process in step S5. In step S31, an error Enc(k−1) between the previous value Pcyl_cmp(k−1) of the drift change rate and its desired value Pcyl_comp_cmd is calculated. In step S32, an error Enc(k) between the current value Pcyl_cmp(k) of the drift change rate and its desired value Pcyl_comp_cmd is calculated.

In step S33, the switching function σ is calculated in accordance with the above-described equation (9). In step S34, the reaching law input Urch is calculated in accordance with the above-described equation (12).

In step S35, the switching function σ(k) is added to the previous value G(k−1) of the integral of the switching function to calculate the current value G(k) of the integral of the switching function. In step S36, the adaptive law input Uadp is calculated in accordance with the above-described equation (13). In step S37, a control input into the correction unit 31, that is, the drift correction term Pcyl_comp_SLD is calculated in accordance with the above-described equation (14).

Alternatively, another control scheme such as a back-stepping scheme or an optimum control may be used instead of the response assignment control so as to determine the drift correction term Pcyl_comp_SLD. Further, another type of the response assignment control may be used.

A flowchart according to the first embodiment is omitted. However, those skilled in the art would modify the flowchart shown in FIGS. 18 to 20 to adapt to the first embodiment.

Further, the flowchart shown in FIGS. 18 to 20 is based on the drift change rate determination unit 33 shown in FIG. 5. However, those skilled in the art would modify this flowchart to adapt to the drift change rate determination unit 33 shown in FIG. 10.

Third Embodiment

The third embodiment of the present invention will be described. Referring back to FIG. 3, the principles of the third embodiment of the present invention will be described. As described above, FIG. 3(b) shows the waveform of the in-cylinder pressure obtained by integrating the output Vps of the in-cylinder pressure sensor shown in FIG. 3(a). As shown by the line 81, the in-cylinder pressure sensor includes a drift. In this embodiment, the in-cylinder pressure sensor obtained by the integral is represented by Pcyl'. A relationship between Vps and Pcyl' is expressed by the equation (18).

$$Pcyl' = \int Vps \qquad (18)$$

According to the third embodiment, a drift shown by the line 81 is determined. Then, the in-cylinder pressure Pcyl' is corrected so that the determined drift is removed from the in-cylinder pressure Pcyl'. Thus, the corrected in-cylinder pressure Pcyl containing no drift is determined. FIG. 3(c) shows the corrected in-cylinder pressure Pcyl.

As is the case for the first and second embodiments, the time is measured by using the crank angle. However, alternatively, the time may be measured by using another parameter.

Figure 22:
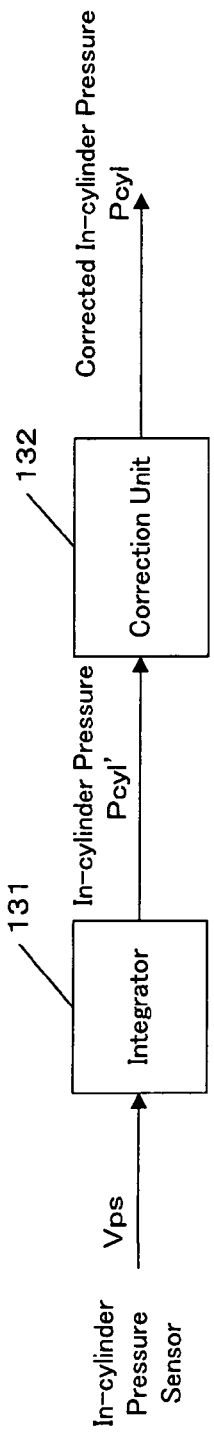
FIG. 22 is a block diagram of an in-cylinder pressure detecting apparatus in accordance with yet another embodiment of the present invention.

FIG. 22 is a block diagram of an in-cylinder pressure detecting apparatus in accordance with the third embodiment of the present invention. As is the case for the first and second embodiments, the in-cylinder pressure detecting apparatus according to the third embodiment can be implemented in the ECU 1.

The output of the in-cylinder pressure sensor 15 is converted from analog to digital and is input into the in-cylinder pressure detecting apparatus as Vps. As described above, Vps indicates the change rate of the in-cylinder pressure.

An integrator 131 integrates the change rate Vps of the in-cylinder pressure to determine the in-cylinder pressure Pcyl' as shown in the above-described the equation (18).

A correction unit 132 corrects the in-cylinder pressure Pcyl' so that a drift is removed from the in-cylinder pressure Pcyl'. Thus, the corrected in-cylinder pressure Pcyl is determined. This correction is repeated at a predetermined time interval. Accordingly, a drift is removed from the in-cylinder pressure sensor Pcyl' at every predetermined time interval.

The integral by the integrator 131 and the correction by the correction unit 132 are carried out in a cycle of Tk that is shorter than Tn. As described above, Tn indicates the length of the combustion cycle. As described above, it is preferable that Tk is set to be equal to the length of a cycle in which the A/D conversion of the output of the in-cylinder pressure sensor is performed. In doing so, the in-cylinder pressure Pcyl' can be corrected to remove a drift every time the output of the in-cylinder pressure sensor is obtained as a digital value Vps.

Figure 23:
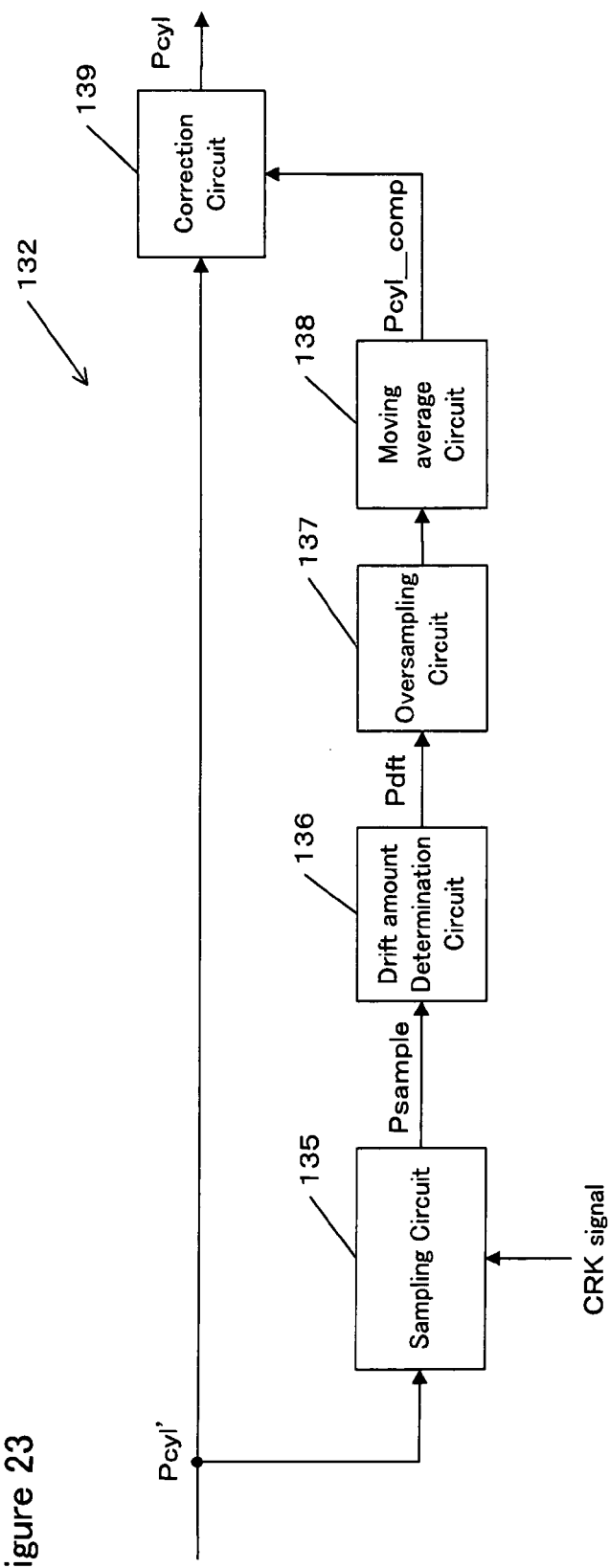
FIG. 23 is a block diagram of one example of a correction unit in accordance with yet another embodiment of the present invention.

FIG. 23 is a detailed block diagram of one example of the correction unit 132. A sampling circuit 135 and a drift amount determination unit 136 operate in a similar way to the sampling circuit 35 and the drift amount determination unit 36 in the first and second embodiments, except that the sampling by the sampling circuit 135 is applied to the in-cylinder pressure Pcyl' containing a drift. Specifically, the sampling circuit 135 samples the in-cylinder pressure Pcyl' at a predetermined crank angle in each combustion cycle. Preferably, the sampling is performed at a predetermined crank angle during the intake stroke of the combustion cycle. As described above referring to the equation (6), the drift amount determination unit 136 determines a drift amount Pdft by subtracting a reference value from a sample Psample obtained by the sampling circuit 135. As is the case for the first and second embodiments, in one example, the reference value is set to the intake manifold pressure Pb during an intake stroke of the combustion cycle.

An oversampling circuit 137 oversamples the drift amount Pdft to obtain samples of the drift amount Pdft. A moving average circuit 138 applies a moving average to the samples of the drift amount Pdft.

Figure 24:
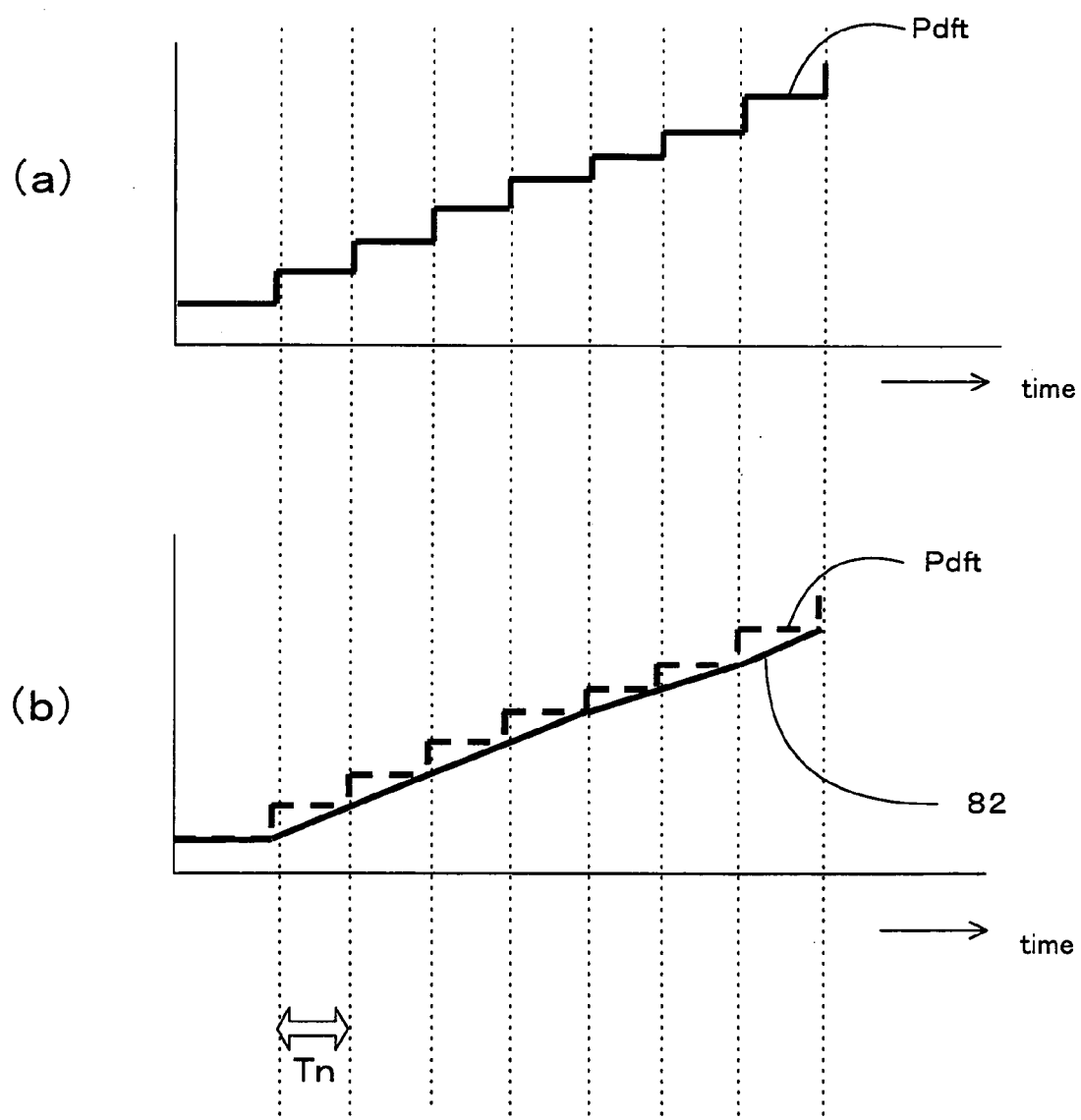
FIG. 24 schematically shows a drift amount Pcyl_comp per Tk in accordance with yet another embodiment of the present invention.

Referring to FIG. 24, the oversampling and the moving average will be specifically described. FIG. 24(a) shows an exemplary waveform of the drift amount Pdft determined by the drift amount determination circuit 136 in each combustion cycle (that is, in a cycle of Tn). The oversampling circuit 137 oversamples the drift amount Pdft in a cycle of Tk, which is shorter than Tn.

The number of times of sampling "m" in one combustion cycle is (Tn/Tk). The moving average circuit 138 calculates an average of the samples Pdft(k−(m−1)) to Pdft(k) in accordance with the equation (19) every time a sample of the drift amount is obtained by the oversampling. k indicates a cycle number. Thus, a drift amount Pcyl_comp per Tk is determined.

$$Pcyl\_comp(k) = \frac{Pdft(k-(m-1)) + Pdft(k-(m-2)) + \ldots, + Pdft(k-1) + Pdft(k)}{m} \qquad (19)$$

A line 82 in FIG. 24(b) shows an example of the drift amount Pcyl_comp thus determined. It should be noted that the line 82 corresponds to the line 81 shown in FIG. 3(b).

Referring back to FIG. 23, a correction circuit 139 receives the drift amount Pcyl_comp per Tk as a drift correction term. The correction circuit 139 corrects the in-cylinder pressure Pcyl' by subtracting the drift correction term Pcyl_comp from the in-cylinder pressure Pcyl', to determine a corrected in-cylinder pressure Pcyl. The corrected in-cylinder pressure Pcyl represents the in-cylinder pressure containing no drift as described above referring to FIG. 3(c).

Thus, the in-cylinder pressure Pcyl' is corrected with the drift correction term Pcyl_comp every time the output of the in-cylinder pressure sensor is obtained as a digital value Vps. Since the length of Tk is shorter than the length of the combustion cycle, it is prevented that a drift is accumulated in the in-cylinder pressure over one combustion cycle.

In the embodiment, the moving average is used to determine the average of samples obtained by the oversampling of the drift amount. Alternatively, another filtering (for example, a low-pass filter) may be used.

In the embodiment, the drift amount Pdft is determined by subtracting the reference value Pb from the in-cylinder pressure Pcyl'. Alternatively, the in-cylinder pressure Pcyl' during the intake stroke may be used as the drift amount Pdft, because it can be regarded that a pressure detected by the in-cylinder pressure sensor during the intake stroke (especially, around the starting time of the intake stroke) is caused by a drift. However, by using the reference value, especially by setting the intake manifold pressure Pb in the reference value, the drift amount Pdft can be more accurately determined and the accuracy of the absolute value of the in-cylinder pressure Pcyl after the drift correction can be improved.

It should be noted that operation as described above referring to FIG. 9 is applied to the sampling circuit 135. In this case, the signal shown in FIG. 9(a) corresponds to Pcyl' in this embodiment.

Figure 25:
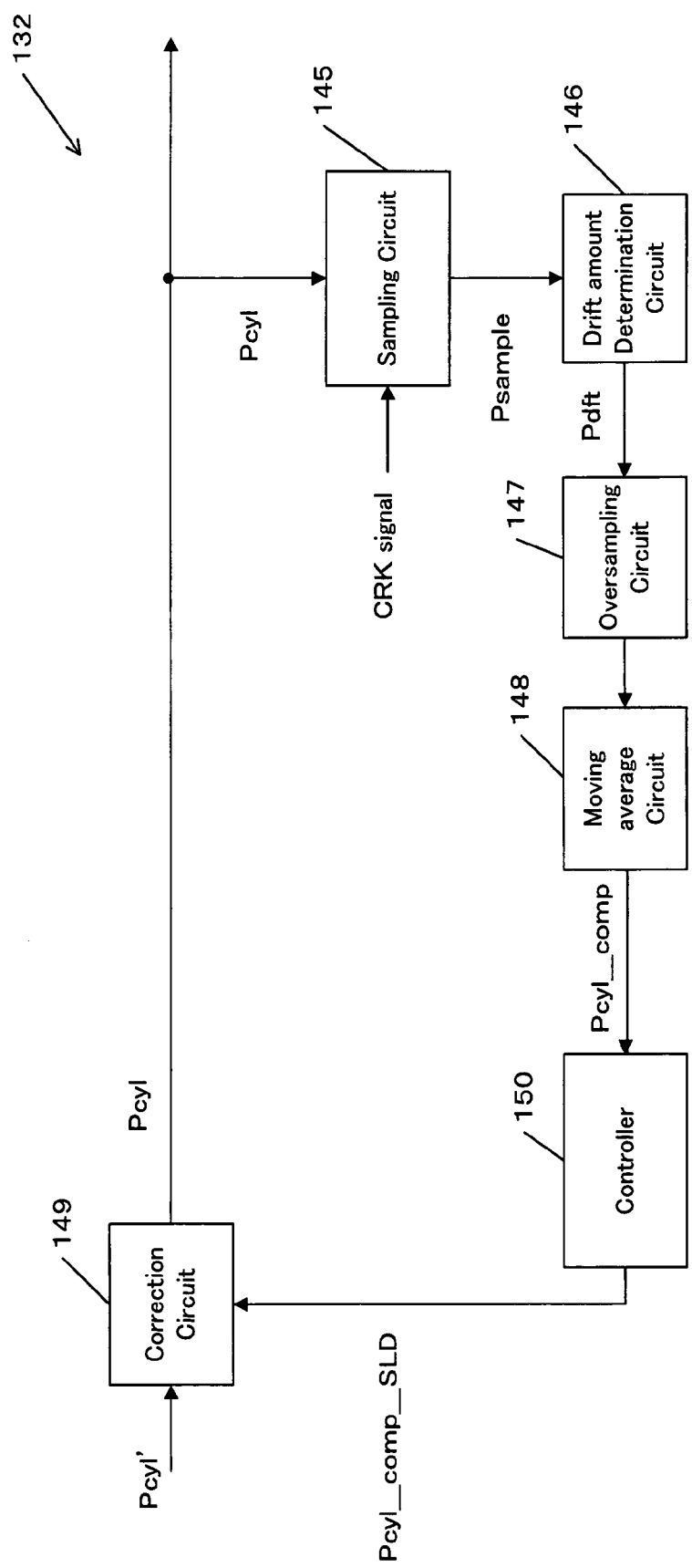
FIG. 25 is a block diagram of another example of a correction unit in accordance with yet another embodiment of the present invention.

FIG. 25 shows a detailed block diagram of another example of the correction unit 132 shown in the in-cylinder pressure detecting apparatus of FIG. 22. A main difference between the correction unit 132 shown in FIG. 23 and the correction unit 132 shown in FIG. 25 is that a controller 150 is provided.

A sampling circuit 145 samples the corrected cylinder pressure Pcyl. The sampling is performed in a similar way to the sampling by the sampling circuit 135 shown in FIG. 23. A sample Psample obtained by the sampling is held in the sampling circuit 145. It should be noted that the object of the sampling by the sampling circuit 135 is the in-cylinder pressure Pcyl' before the correction whereas the object of the sampling by the sampling circuit 145 is the in-cylinder pressure Pcyl after the correction. This is because the controller in the embodiment needs to use, as an input, a signal in which a drift correction term Pcyl_comp_SLD generated by the controller is reflected (that is, the corrected in-cylinder pressure Pcyl).

A drift amount determination circuit 146, an oversampling circuit 147 and a moving average circuit 148 operate in a similar way to the drift amount determination circuit 136, the oversampling circuit 137 and the moving average circuit 138 shown in FIG. 23, respectively.

The controller 150 determines the drift correction term Pcyl_comp_SLD so that the drift amount Pcyl_comp per Tk converges to a desired value Pcyl_comp_cmd. The correction circuit 149 corrects the in-cylinder pressure Pcyl' by adding the drift correction term Pcyl_comp_SLD to the in-cylinder pressure Pcyl', to determine the corrected in-cylinder pressure Pcyl.

In this example, the desired value Pcyl_comp_cmd is set to zero because a difference between the in-cylinder pressure Pcyl and the intake manifold pressure Pb during an intake stroke is controlled to be zero. In the case where the subtraction of the reference value Pb from the in-cylinder pressure sample Psample is not performed, an intake manifold pressure Pb that is sampled during the intake stroke is set in the desired value Pcyl_comp_cmd.

The controller 150 performs the above described response assignment control in a cycle of Tk, which is shorter than the length Tn of the combustion cycle, to cause the drift amount Pcyl_comp to converge. A detail of the response assignment control will be omitted because it is described above referring to FIGS. 13 to 15.

As shown in FIG. 25, the drift correction term Pcyl_comp_SLD(k) determined by the controller 150 in the current cycle is fed back to the correction circuit 149. The correction circuit 149 adds the received drift correction term Pcyl_comp_SLD(k) to the in-cylinder pressure Pcyl'(k+1) that is obtained in the next cycle to determine the corrected in-cylinder pressure Pcyl(k+1). Again, the drift correction term Pcyl_comp_SLD(k+1) is determined based on the corrected in-cylinder pressure Pcyl(k+1) and then fed back to the correction circuit 149.

Figure 26:
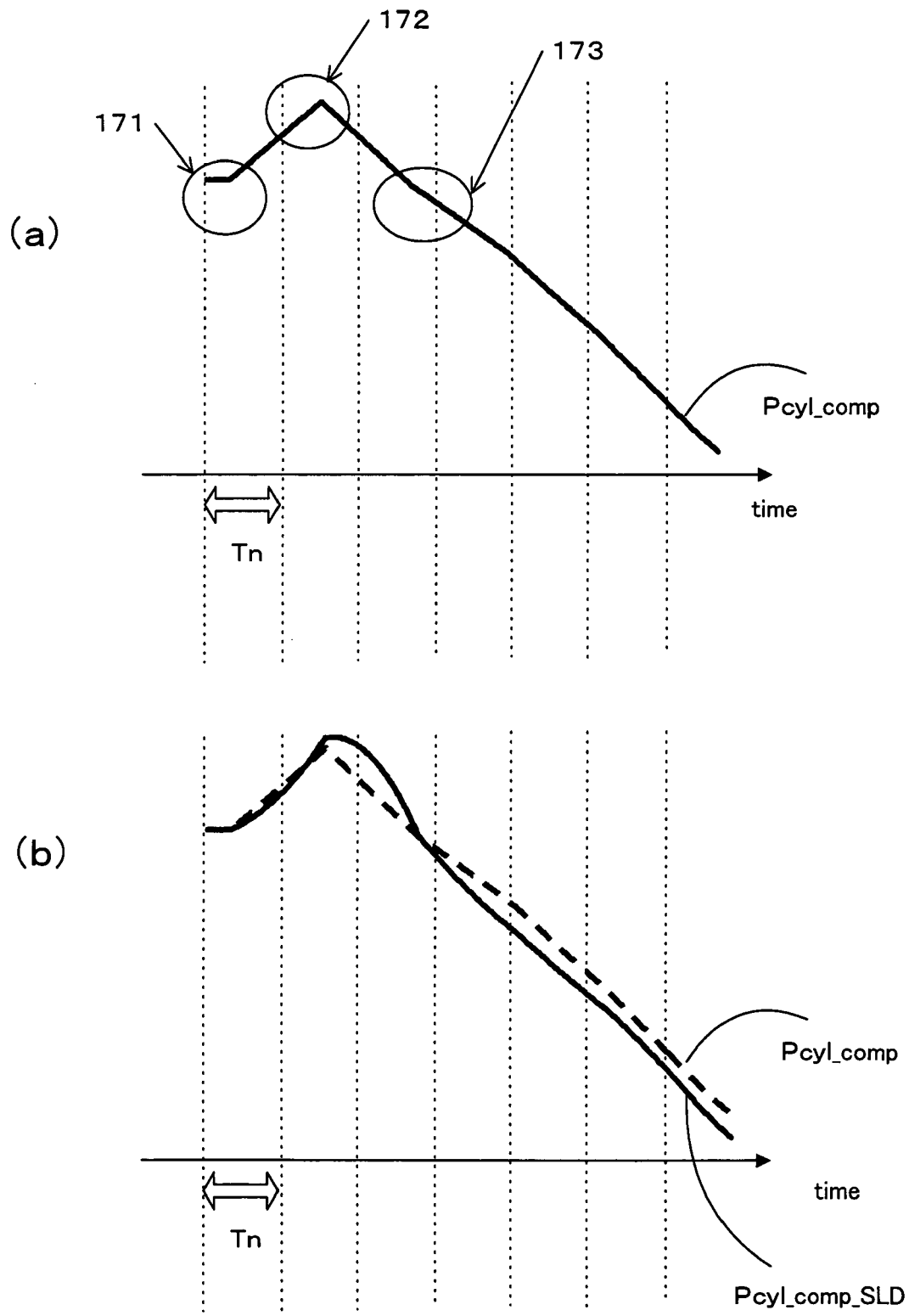
FIG. 26 schematically shows (a) discontinuity of a drift correction term when a response assignment control is not used, and (b) continuity of a drift correction term when a response assignment is used in accordance with yet another embodiment of the present invention.

Referring to FIG. 26, the effect of using the response assignment control will be described. FIG. 26(a) shows a waveform of the drift amount Pcyl_comp generated by the moving average circuit 138 of FIG. 23. It is seen that discontinuity appears as shown by reference numerals 171 to 173. This discontinuity is generated because the drift amount Pdft is calculated every combustion cycle (in other words, because the calculated drift amount Pdft is constant over Tn). If the in-cylinder pressure Pcyl' is corrected with such drift amount Pcyl_comp, discontinuity may appear in the waveform of the corrected in-cylinder pressure. This is undesirable in a subsequent process such as a frequency resolution process of the in-cylinder pressure. The response assignment control can remove such discontinuity.

FIG. 26(b) shows the drift correction term Pcyl_comp_SLD determined by the controller 150. For the purpose of comparison, the drift amount Pcyl_comp of FIG. 26(a) is shown by a dotted line.

Since the drift correction term Pcyl_comp_SLD is determined to gradually approach a desired value (that is, zero in this example) by the response assignment control, the drift correction term Pcyl_comp_SLD is represented by a continuous waveform. Since the waveform of the drift correction term Pcyl_comp_SLD has no discontinuity, it is prevented that discontinuity appears in the waveform of the corrected in-cylinder pressure Pcyl.

Referring to FIG. 27 to FIG. 30, a process for determining the corrected in-cylinder pressure Pcyl in accordance with the third embodiment will be described. The drift correction is implemented by the correction unit 132 of FIG. 25.

Figure 27:
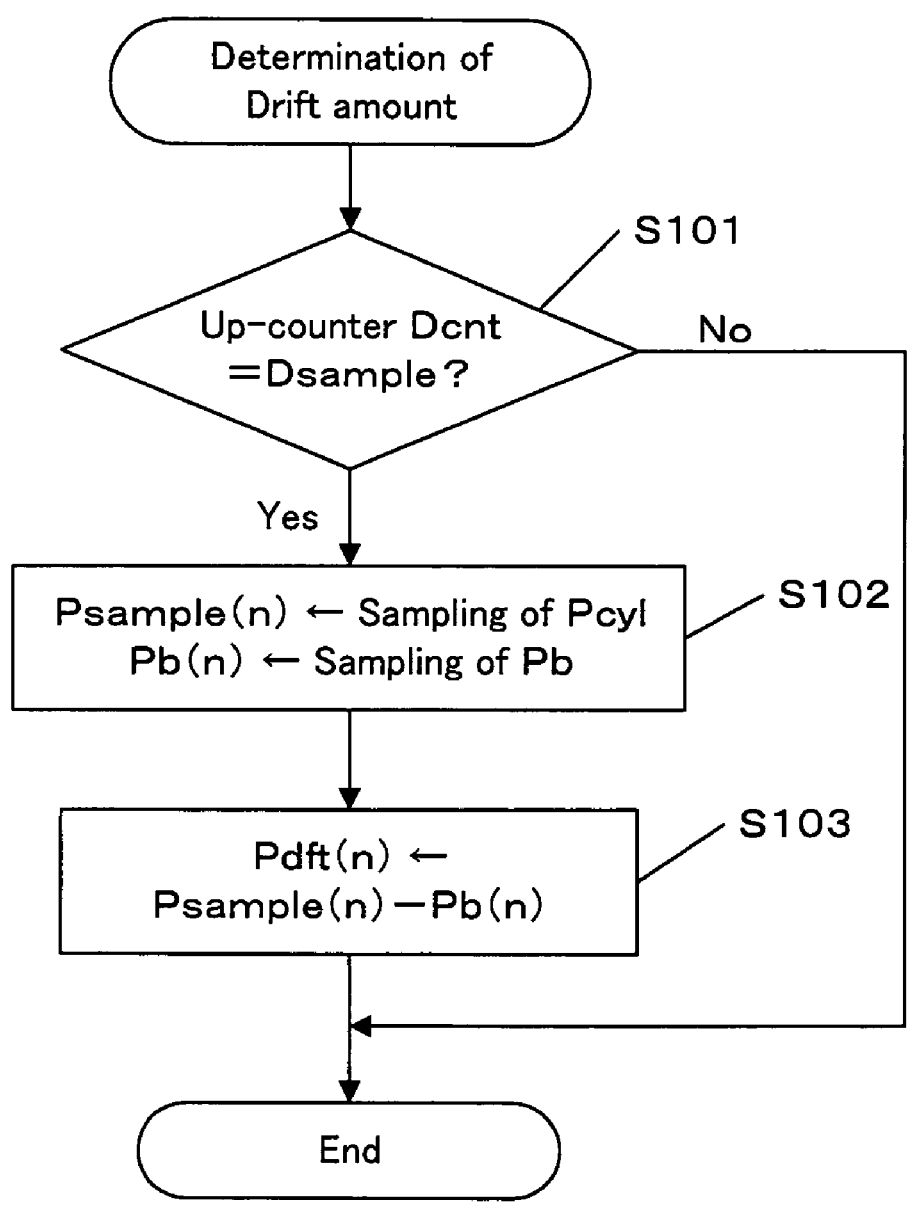
FIG. 27 is a flowchart of a process for determining a drift amount Pdft in accordance with yet another embodiment of the present invention.

FIG. 27 shows a flowchart of a process for determining the drift amount Pdft. As described above, the process is carried out in a cycle of Tn. "n" indicates a cycle number.

In step S101, when the value Dcnt of the up counter has reached the crank angle Dsample at which the in-cylinder pressure is to be sampled, the process starts. In one example, as described above, this process is started at a predetermined timing during the intake stroke of each combustion cycle.

In step S102, the in-cylinder pressure Pcyl is sampled to obtain a in-cylinder pressure sample Psample. The output Pb from the intake manifold pressure sensor is also sampled. In step S103, a difference between the in-cylinder pressure sample Psample and the intake manifold pressure Pb is calculated as the drift amount Pdft.

Figure 28:
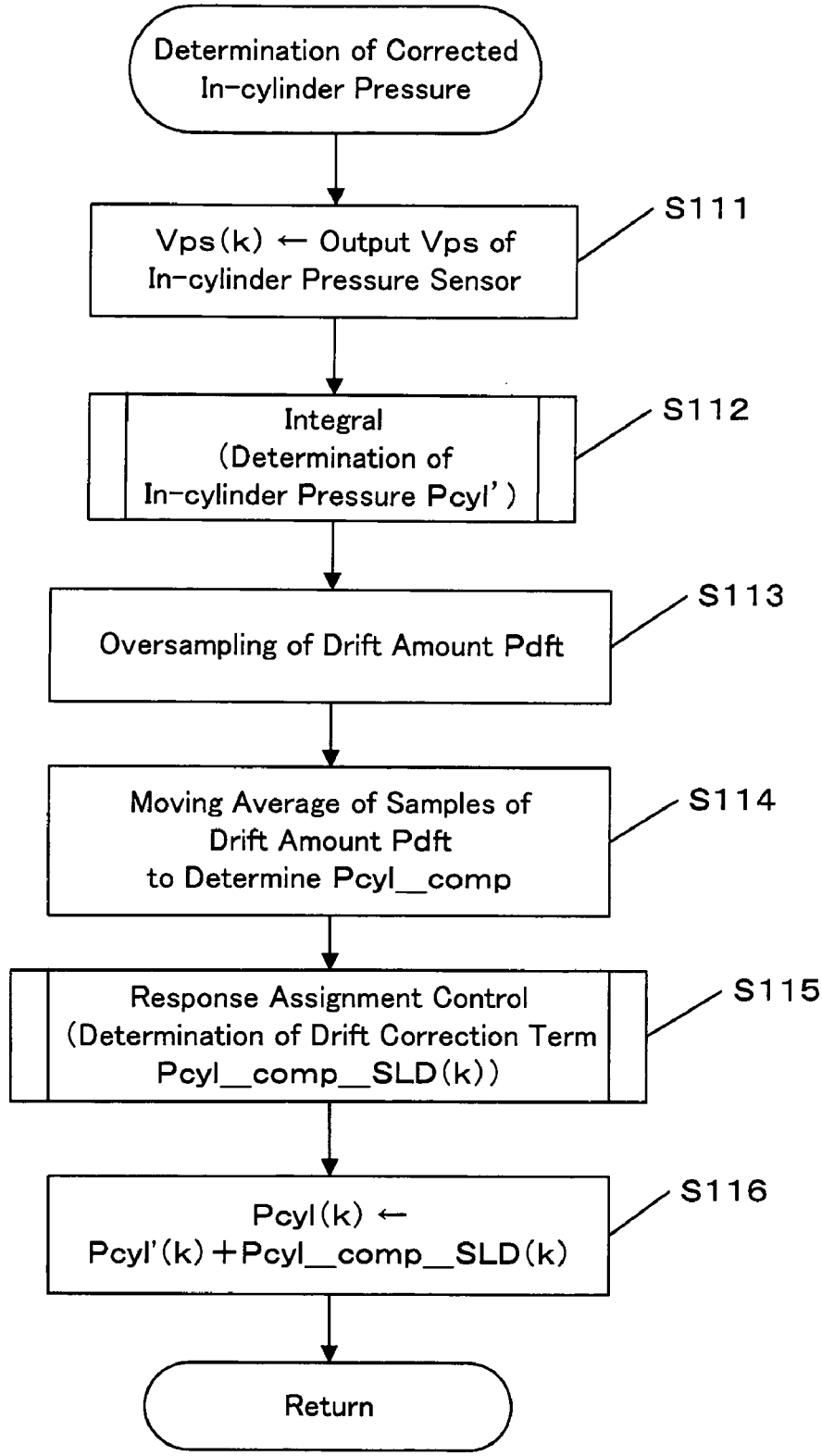
FIG. 28 is a flowchart of a process for determining a corrected in-cylinder pressure Pcyl in accordance yet another embodiment of the present invention.

FIG. 28 shows a flowchart of a process for determining the corrected in-cylinder pressure Pcyl. This process is carried out in a cycle of Tk. "k" indicates a cycle number.

In step S111, the output Vps of the in-cylinder pressure sensor 15 is read (in other words, the output of the in-cylinder pressure sensor 15 is sampled to obtain a digital value Vps). In step S112, the integral routine (FIG. 29) is carried out. In the integral routine, the output Vps of the in-cylinder pressure sensor is integrated to determine the in-cylinder pressure Pcyl'.

In step S113, the drift amount Pdft(n) obtained in step S103 (FIG. 27) is oversampled. In step S114, the moving average is applied to m samples (that is, samples Pdft(k−(m−1)) to Pdft(k)) obtained by the oversampling, as shown in the equation (19), to determine the drift amount Pcyl_comp per Tk.

In step S115, a simplified version of the response assignment control is performed to determine the drift correction term Pcyl_comp_SLD. In step S116, the drift correction term Pcyl_comp_SLD is added to the in-cylinder pressure Pcyl' generated by the integral to determine the corrected in-cylinder pressure Pcyl.

Figure 29:
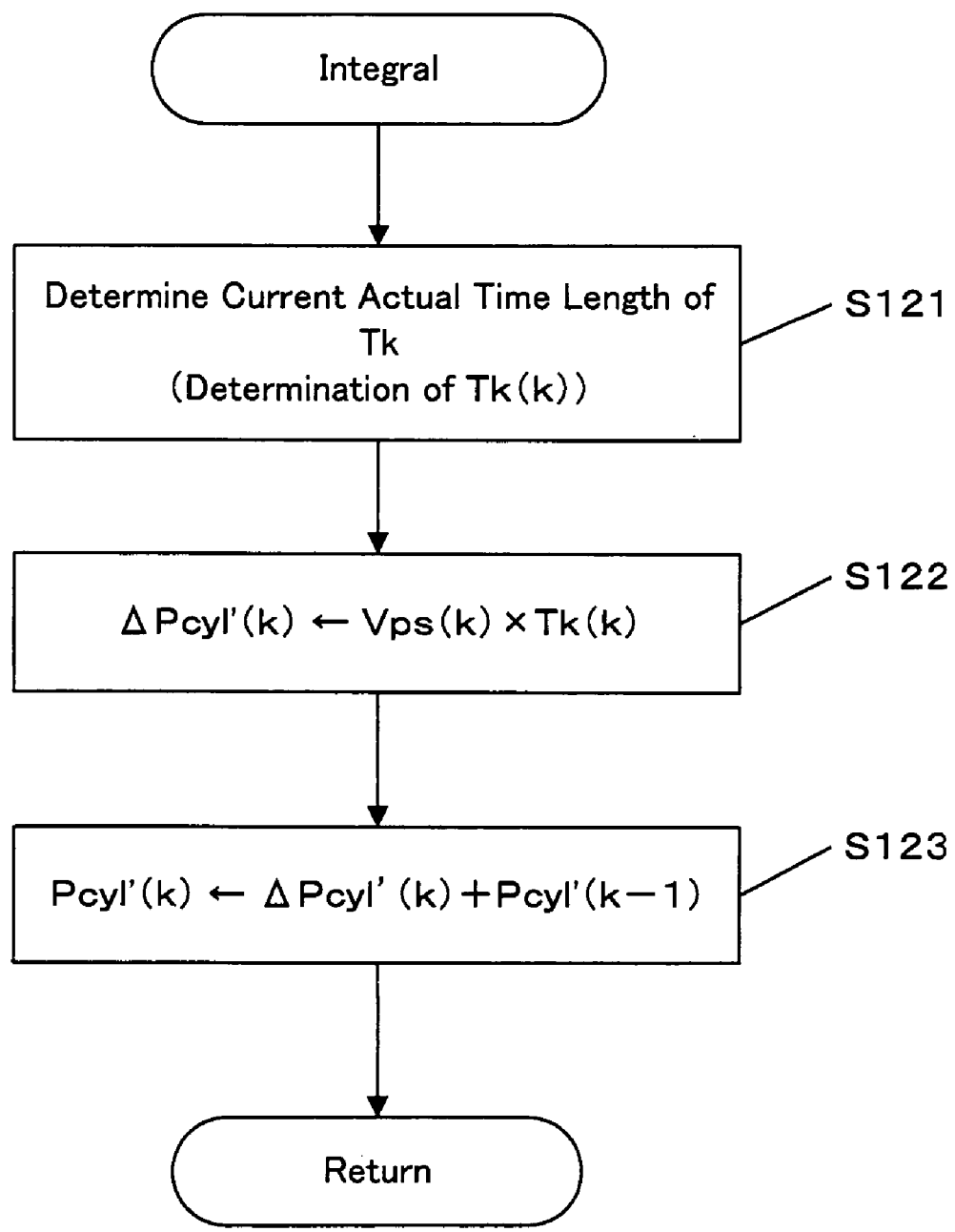
FIG. 29 is a flowchart of an integral process in accordance with yet another embodiment of the present invention.

FIG. 29 shows a flowchart of the integral in step S112 of FIG. 28. In step S121, the current actual time (seconds) of Tk is calculated. This calculation is performed in accordance with the description referring to step S12 of FIG. 19.

Steps S122 and S123 indicate the integral process. In step S122, the amount of change ΔPcyl' of the in-cylinder pressure per Tk(k) is calculated. Since the output Vps(k) of the in-cylinder pressure sensor indicates the change rate of the in-cylinder pressure Pcyl', the amount of change ΔPcyl' of the in-cylinder pressure per Tk(k) is calculated as shown by the equation (20). By using the current actual time length of Tk, the change amount ΔPcyl' of the in-cylinder pressure can be more accurately calculated.

$$\Delta Pcyl'(k) = Vps(k) \times Tk(k) \qquad (20)$$

In step S123, the current value Pcyl'(k) of the in-cylinder pressure is calculated by adding the change amount ΔPcyl'(k) of the in-cylinder pressure per Tk(k) (which is calculated in step S122) to the previous value Pcyl'(k−1) of the in-cylinder pressure.

Alternatively, the calculation of the in-cylinder pressure Pcyl' may be performed at a predetermined time interval, rather than in synchronization with the crank angle. If the calculation is performed at a predetermined time interval, the predetermined time is set in the actual time length Tk(k).

Alternatively, the calculation of the in-cylinder pressure may be performed in synchronization with another parameter. In this case, it is also preferable that the change amount ΔPcyl' of the in-cylinder pressure is calculated in consideration of the current actual time length of Tk.

Figure 30:
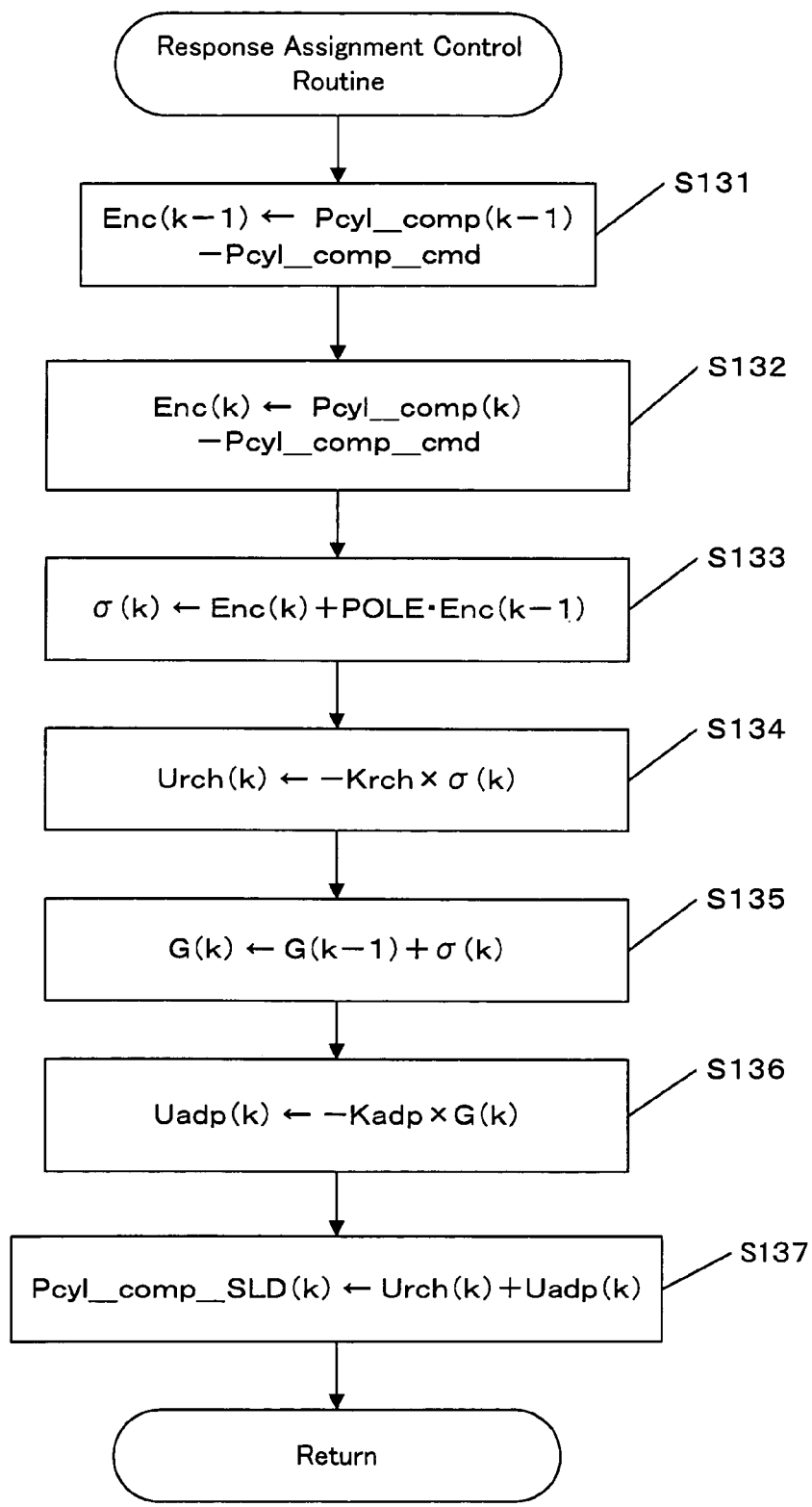
FIG. 30 is a flowchart of a response assignment control in accordance with yet another embodiment of the present invention.
Figure 31:
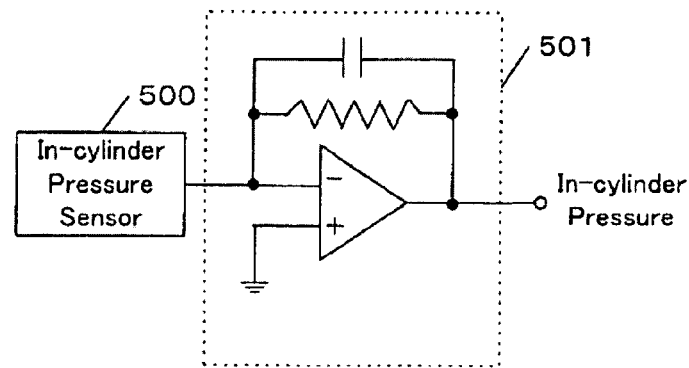
FIG. 31 is a block diagram of an integrator circuit for integrating an output of an in-cylinder pressure sensor in accordance with prior art.
Figure 32:
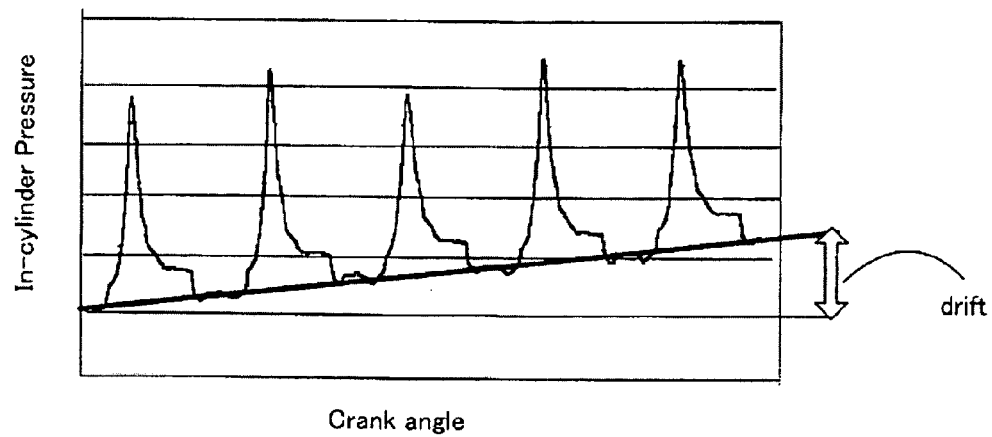
FIG. 32 schematically shows a drift of an in-cylinder pressure.
Figure 33:
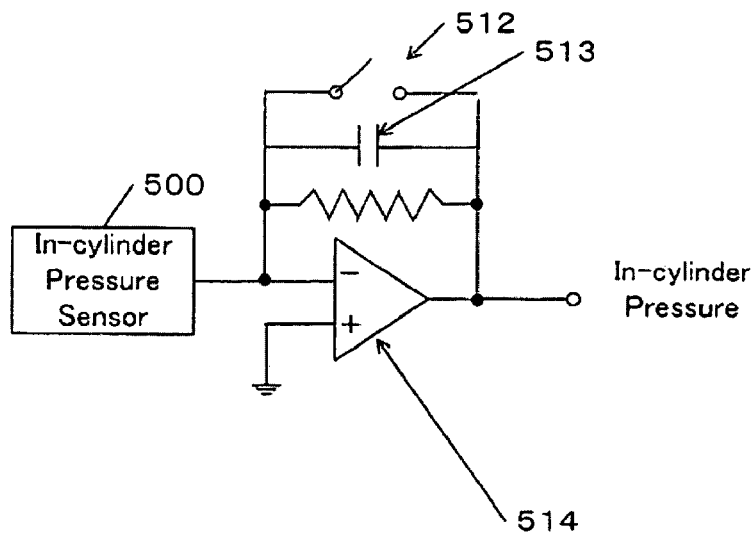
FIG. 33 is a block diagram of a circuit with a resetting means for integrating an output of an in-cylinder pressure sensor in accordance with prior art.
Figure 34:
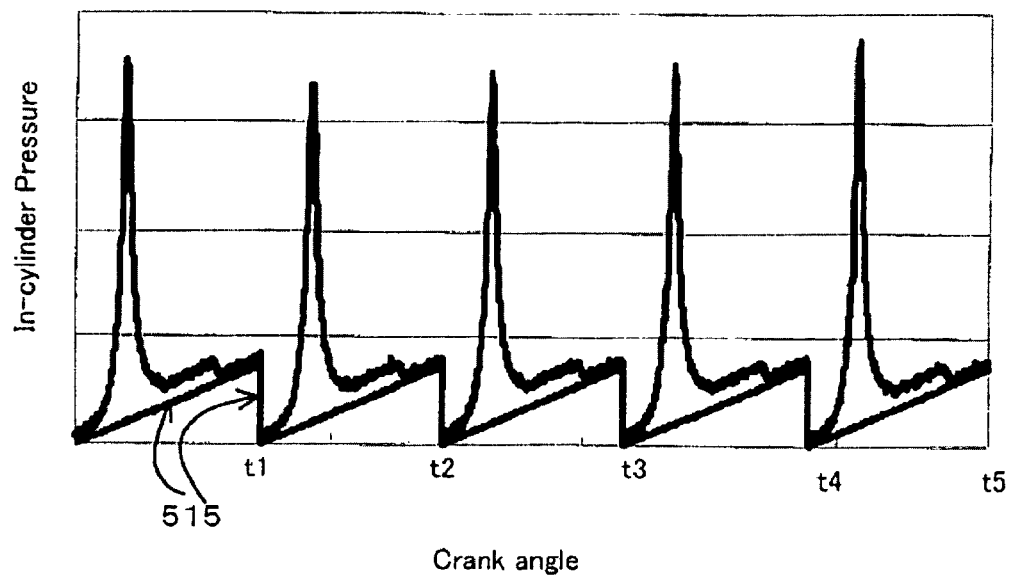
FIG. 34 schematically shows an influence of a resetting operation upon a waveform of an in-cylinder pressure.

FIG. 30 shows a flowchart of the response assignment control in step S115 of FIG. 28. In step S131, an error Enc(k−1) between the previous value Pcyl_comp(k−1) of the drift amount per Tk and its desired value Pcyl_comp_cmd is calculated. In step S132, an error Enc(k) between the current value Pcyl_comp(k) of the drift amount per Tk and its desired value Pcyl_comp_cmd is calculated.

In step S133, the switching function σ is calculated. In step S134, the reaching law input Urch is calculated.

In step S135, the switching function σ(k) is added to the previous value G(k−1) of the integral of the switching function to calculate the current value G(k) of the integral of the switching function. In step S136, the adaptive law input Uadp is calculated. In step S137, a control input into the correction unit 131, that is, the drift correction term Pcyl_comp_SLD is calculated by adding the reaching law input and the adaptive law input.

The flowchart shown in FIGS. 27 to 30 is based on the correction unit 132 shown in FIG. 25. However, those skilled in the art would modify this flowchart to adapt to the correction unit 132 shown in FIG. 23.

The present invention can be applied to a general-purpose engine (for example, an outboard motor).

What is claimed is:

1. An apparatus for detecting an in-cylinder pressure of an engine;
   an in-cylinder pressure sensor for outputting a signal indicating a change rate of the in-cylinder pressure; and
   a control unit configured to:
     correct the signal from the in-cylinder pressure sensor;
     integrate the corrected signal to determine the in-cylinder pressure;
     determine a change rate of a drift contained in the determined in-cylinder pressure; and
     feedback the determined change rate of the drift so that the correction of the signal from the in-cylinder pressure sensor is made with the determined change rate of the drift.

2. The apparatus of claim 1, wherein the control unit is further configured to:
   sample the determined in-cylinder pressure;
   determine a drift amount based on the sampled in-cylinder pressure; and
   determine the change rate of the drift based on the drift amount.

3. The apparatus of claim 2, wherein the control unit is further configured to subtract a reference value from the sampled in-cylinder pressure to determine the drift amount.

4. The apparatus of claim 1, wherein the control unit is further configured to:
   sample the determined in-cylinder pressure in a first cycle;
   determine a drift amount based on the sampled in-cylinder pressure;
   sample the drift amount in a second cycle shorter than the first cycle;
   apply a moving-average to the sampled drift amount to determine a drift amount per the second cycle; and
   determine the change rate of the drift based on the drift amount per the second cycle.

5. The apparatus of claim 4, wherein the control unit is further configured to subtract a reference value from the sampled in-cylinder pressure to determine the drift amount.

6. The apparatus of claim 1, wherein the control unit is further configured to;
   determine a drift correction term for causing the determined change rate of the drift to converge to zero; and
   feedback the drift correction term so that the correction of the signal from the in-cylinder pressure sensor is made with the drift correction term.

7. The apparatus of claim 6, wherein the control unit is further configured to perform a response assignment control that is capable of specifying a convergence speed of the determined change rate of the drift to zero to determine the drift correction term.

8. A method for detecting an in-cylinder pressure of an engine, the method comprising the steps of:
   correcting a signal from an in-cylinder pressure sensor, the signal from the in-cylinder pressure sensor indicating a change rate of the in-cylinder pressure;
   integrating the corrected signal to determine the in-cylinder pressure;
   determining a change rate of a drift contained in the determined in-cylinder pressure;
   feedbacking the determined change rate of the drift so that the correction of the signal from the in-cylinder pressure sensor is made with the determined change rate of the drift.

9. The method of claim 8, further comprising the steps of:
   sampling the determined in-cylinder pressure;
   determining a drift amount based on the sampled in-cylinder pressure, and
   determining the change rate of the drift based on the drift amount.

10. The method of claim 9, further comprising the step of subtracting a reference value from the sampled in-cylinder pressure to determine the drift amount.

11. The method of claim 8, further comprising the steps of:
   sampling the determined in-cylinder pressure in a first cycle;
   determining a drift amount based on the sampled in-cylinder pressure;
   sampling the drift amount in a second cycle shorter than the first cycle;
   applying a moving-average to the sampled drift amount to determine a drift amount per the second cycle; and determining the change rate of the drift based on the drift amount per the second cycle.

12. The method of claim 11, further comprising the step of subtracting a reference value from the sampled in-cylinder pressure to determine the drift amount.

13. The method of claim 8, further comprising the steps of;
determining a drift correction term for causing the determined change rate of the drift to converge to zero; and
feedbacking the drift correction term so that the correction of the signal from the in-cylinder pressure sensor is made with the drift correction term.

14. The method of claim 13, further comprising the step of performing a response assignment control that is capable of specifying a convergence speed of the determined change rate of the drift to zero to determine the drift correction term.

15. An apparatus for detecting an in-cylinder pressure of an engine;
an in-cylinder pressure sensor for outputting a signal indicating a change rate of the in-cylinder pressure; and
a control unit configured to:
integrate the signal to determine the in-cylinder pressure;
correct the in-cylinder pressure with a drift correction term, the drift correction term removing a drift in the in-cylinder pressure;
sample the in-cylinder pressure determined by the integral in a first cycle;
determine a drift amount based on the sampled in-cylinder pressure;
sample the drift amount in a second cycle shorter than the first cycle;
average the sampled drift amount to determine the drift correction term; and
subtract the drift correction term from the in-cylinder pressure determined by the integral to determine the corrected in-cylinder pressure.

16. The apparatus of claim 15, wherein the control unit is further configured to subtract a reference value from the sampled in-cylinder pressure to determine the drift amount.

17. The apparatus of claim 16, wherein the first cycle is a cycle in which an intake stroke of a combustion cycle of the engine is performed.

18. An apparatus for detecting an in-cylinder pressure of an engine;
an in-cylinder pressure sensor for outputting a signal indicating a change rate of the in-cylinder pressure; and
a control unit configured to:
integrate the signal to determine the in-cylinder pressure;
correct the in-cylinder pressure with a drift correction term, the drift correction term removing a drift in the in-cylinder pressure;
sample the corrected in-cylinder pressure in a first cycle;
determine a drift amount based on the sampled corrected in-cylinder pressure;
sample the drift amount in a second cycle shorter than the first cycle;
average the sampled drift amount;
determine the drift correction term to cause the averaged drift amount to converge to zero; and
feedback the drift correction term so that the correction is made with the drift correction term.

19. The apparatus of claim 18, wherein the control unit is further configured to subtract a reference value from the sampled in-cylinder pressure to determine the drift amount.

20. The apparatus of claim 19, wherein the first cycle is a cycle in which an intake stroke of a combustion cycle of the engine is performed.

21. A method for detecting an in-cylinder pressure of an engine, the method comprising the steps of:
integrating a signal from an in-cylinder pressure sensor to determine the in-cylinder pressure, the signal from the in-cylinder pressure sensor indicating a change rate of the in-cylinder pressure;
correcting the in-cylinder pressure with a drift correction term, the drift correction term removing a drift in the in-cylinder pressure;
sampling the in-cylinder pressure determined by the integrating step in a first cycle;
determining a drift amount based on the sampled in-cylinder pressure;
sampling the drift amount in a second cycle shorter than the first cycle;
averaging the sampled drift amount to determine the drift correction term; and
subtracting the drift correction term from the in-cylinder pressure determined by the integrating step to determine the corrected in-cylinder pressure.

22. The method of claim 21, further comprising the step of subtracting a reference value from the sampled in-cylinder pressure to determine the drift amount.

23. The method of claim 22, wherein the first cycle is a cycle in which an intake stroke of a combustion cycle of the engine is performed.

24. A method for detecting an in-cylinder pressure of an engine, the method comprising the steps of:
integrating a signal from an in-cylinder pressure sensor to determine the in-cylinder pressure, the signal from the in-cylinder pressure sensor indicating a change rate of the in-cylinder pressure;
correcting the in-cylinder pressure with a drift correction term, the drift correction term removing a drift in the in-cylinder pressure;
sampling the corrected in-cylinder pressure in a first cycle;
determining a drift amount based on the sampled corrected in-cylinder pressure;
sampling the drift amount in a second cycle shorter than the first cycle;
averaging the sampled drift amount;
determine the drift correction term to cause the averaged drift amount to converge to zero; and
feedbacking the drift correction term so that the correction is made with the drift correction term.

25. The method of claim 24, further comprising the step of subtracting a reference value from the sampled in-cylinder pressure to determine the drift amount.

26. The method of claim 25, wherein the first cycle is a cycle in which an intake stroke of a combustion cycle of the engine is performed.

* * * * *